United States Patent
Bozkurt et al.

(10) Patent No.: US 12,148,568 B2
(45) Date of Patent: *Nov. 19, 2024

(54) CHARGE-DISCHARGE METHOD FOR CYCLING A POLYMER-REINFORCED CAPACITOR

(71) Applicant: Imam Abdulrahman Bin Faisal University, Dammam (SA)

(72) Inventors: Ayhan Bozkurt, Dammam (SA); Emre Cevik, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,409

(22) Filed: Sep. 28, 2023

(65) Prior Publication Data

US 2024/0021378 A1  Jan. 18, 2024

Related U.S. Application Data

(63) Continuation of application No. 18/318,399, filed on May 16, 2023, now Pat. No. 11,810,717, which is a (Continued)

(51) Int. Cl.
*H01G 11/56* (2013.01)
*C08F 30/02* (2006.01)
(Continued)

(52) U.S. Cl.
CPC ............ *H01G 11/56* (2013.01); *C08F 30/02* (2013.01); *C08K 3/28* (2013.01); *C08K 2201/001* (2013.01); *H01G 11/32* (2013.01)

(58) Field of Classification Search
None
See application file for complete search history.

(56) References Cited

U.S. PATENT DOCUMENTS

| | | |
|---|---|---|
| 4,554,216 A | 11/1985 | Mohr |
| 5,731,105 A | 3/1998 | Fleischer |
| (Continued) | | |

FOREIGN PATENT DOCUMENTS

| | | |
|---|---|---|
| CN | 102421525 A | 4/2012 |
| CN | 101587780 B | 1/2013 |
| (Continued) | | |

OTHER PUBLICATIONS

Takeshi Kondo, et al., "Polyoxometalate-Modified Boron-Doped Diamond Electrodes", Japanese Journal of Applied Physics, vol. 51, 2012, pp. 090121-1-090121-7.

(Continued)

*Primary Examiner* — Dion R. Ferguson
(74) *Attorney, Agent, or Firm* — Oblon, McClelland, Maier & Neustadt, L.L.P.

(57) ABSTRACT

A poly(vinylphosphonic acid) (PVPA)-$(NH_4)_2MoO_4$), gel polymer electrolyte can be prepared by incorporating redox-mediated Mo, or similar metal, into a PVPA, or similar polymer, matrix. Gel polymer electrolytes including PVPA/ MoX, x representing the percent fraction Mo in PVPA, can be used to make supercapacitors including active carbon electrodes. The electrolytes can be in gel form, bendable and stretchable in a device. Devices including this gel electrolyte can have a specific capacitance (Cs) of 1276 F/g, i.e., a more than 50-fold increase relative to a PVPA system without Mo. A PVPA/Mo10 supercapacitor can have an energy density of 180.2 Wh/kg at power density of 500 W/kg, and devices with this hydrogel structure may maintain 85+% of their initial capacitance performance after 2300 charge-discharge cycles.

12 Claims, 25 Drawing Sheets

Related U.S. Application Data continuation of application No. 18/048,459, filed on Oct. 21, 2022, now Pat. No. 11,749,468, which is a continuation of application No. 17/712,211, filed on Apr. 4, 2022, now Pat. No. 11,551,880, which is a continuation of application No. 16/658,784, filed on Oct. 21, 2019, now Pat. No. 11,328,877.

(51) Int. Cl.
    *C08K 3/28*     (2006.01)
    *H01G 11/32*     (2013.01)

(56) References Cited

U.S. PATENT DOCUMENTS

| | | | |
|---|---|---|---|
| 6,225,009 | B1 | 5/2001 | Fleischer et al. |
| 11,127,539 | B2 | 9/2021 | Alamro |
| 11,328,877 | B2 | 5/2022 | Bozkurt |
| 11,749,468 | B2 * | 9/2023 | Bozkurt .......... H01G 11/38 361/502 |
| 11,810,717 | B2 * | 11/2023 | Bozkurt .......... H01G 11/38 |
| 2003/0082459 | A1 | 5/2003 | Sawa |
| 2011/0272284 | A1 | 11/2011 | Elbick et al. |
| 2013/0052489 | A1 | 2/2013 | Zhamu |
| 2019/0055371 | A1 | 2/2019 | Liu |
| 2021/0118626 | A1 | 4/2021 | Bozkurt |

FOREIGN PATENT DOCUMENTS

| | | |
|---|---|---|
| CN | 103680968 A | 3/2014 |
| CN | 106024403 A | 10/2016 |
| JP | 2002507310 A | 3/2002 |
| JP | 2012169311 A | 9/2012 |
| WO | WO-2012138403 A2 | 10/2012 |
| WO | WO-2017126701 A1 | 7/2017 |
| WO | WO-2020208348 A1 | 10/2020 |

OTHER PUBLICATIONS

E. Neofotistou, et al., "Cationic polymeric chemical inhibitors and multifunctional blends for the control of silica scale in process waters", Int. J. Corros. Scale Inhib., vol. 3, No. 1, 2014, pp. 28-34.

Zhongkai Hu, et al., "Highly efficient and excellent reusable catalysts of molybdenum(VI) complexes grafted on ZPS-PVPA for epoxidation of olefins with tert-BuOOH", Applied Organometallic Chemistry, vol. 25, Issue 2, Oct. 20, 2010, pp. 128-132 (Abstract only).

Zhongkai Hu, et al., "Olefin epoxidation catalyzed by Schiff base molybdenum (VI) complexes immobilized onto zirconium poly (styrene-phenylvinylphosphonate)-phosphate", Inorganic Chemistry Communications, vol. 14, Issue 3, Mar. 2011, pp. 497-501 (Abstract only).

\* cited by examiner

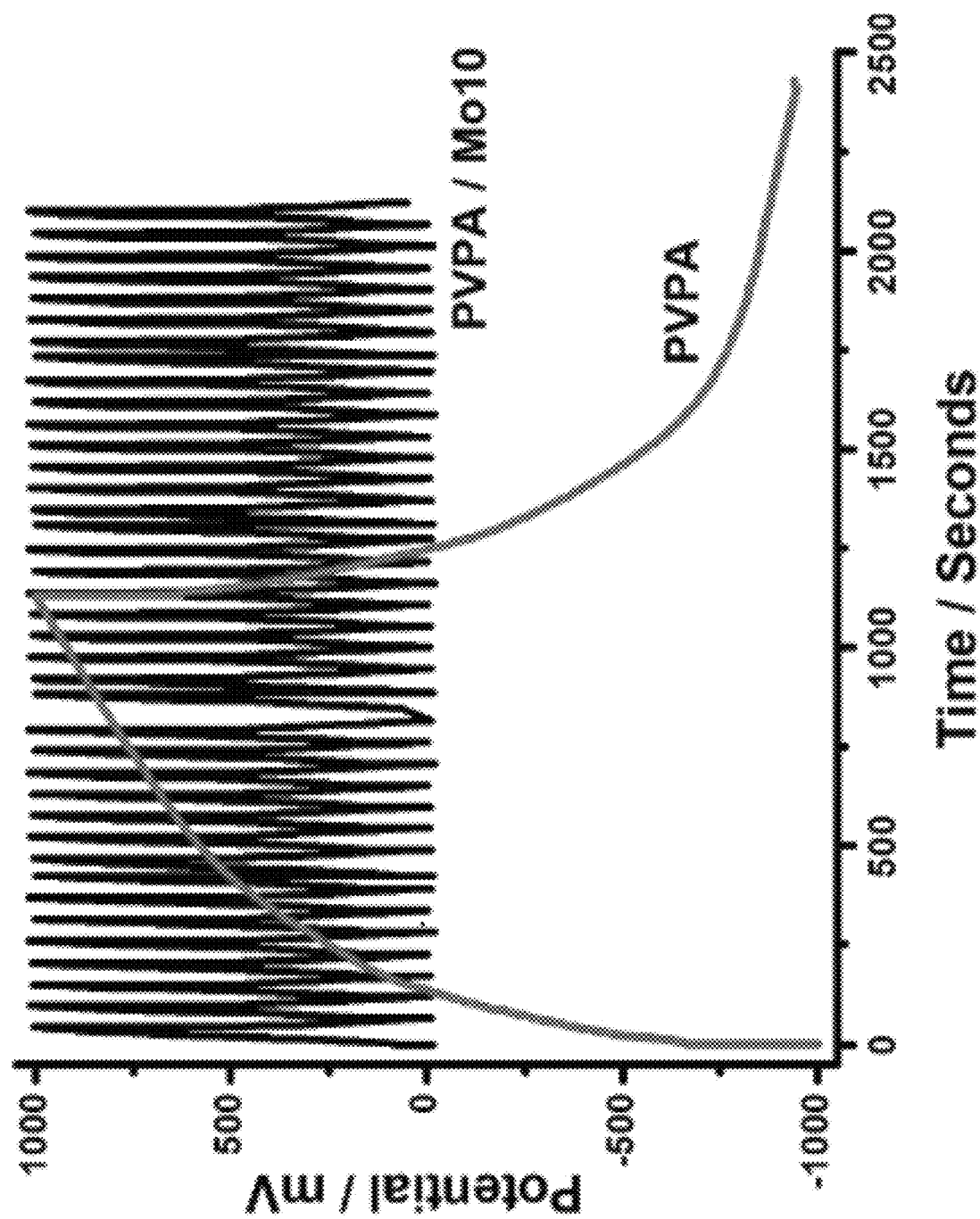

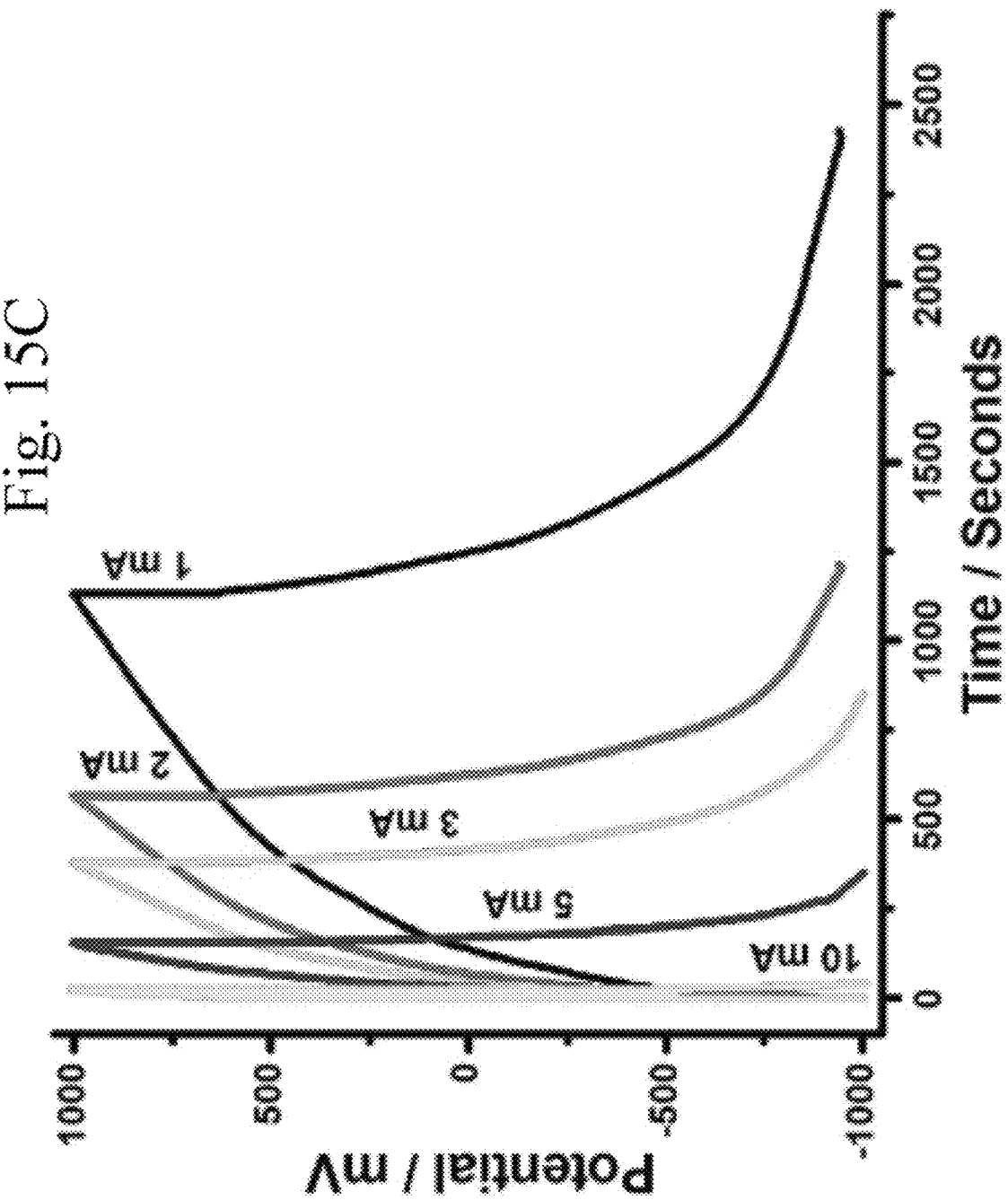

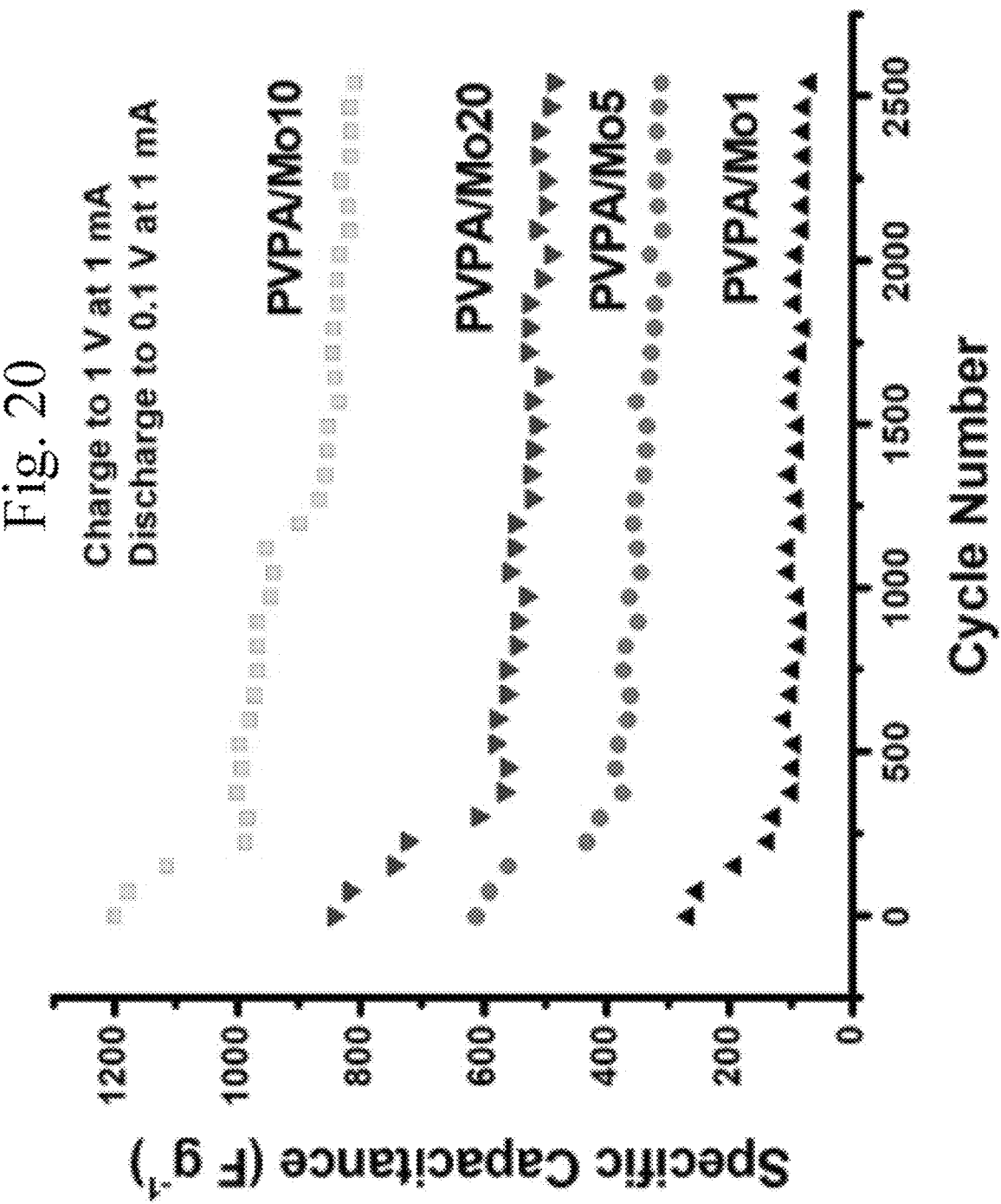

CHARGE-DISCHARGE METHOD FOR CYCLING A POLYMER-REINFORCED CAPACITOR

CROSS-REFERENCE TO RELATED APPLICATIONS

The present application is a Continuation of U.S. application Ser. No. 18/318,399, now allowed, having a filing date of May 16, 2023 which is a Continuation of U.S. application Ser. No. 18/048,459, now U.S. Pat. No. 11,749,468, having a filing date of Oct. 21, 2022, which is a Continuation of U.S. application Ser. No. 17/712,211, now U.S. Pat. No. 11,551,880, having a filing date of Apr. 4, 2022 which is a Continuation of U.S. application Ser. No. 16/658,784, now U.S. Pat. No. 11,328,877, having a filing date of Oct. 21, 2019.

BACKGROUND OF THE INVENTION

Field of the Invention

The present disclosure relates to electrolyte gels, particularly flexible electrolyte gels, such as those comprising charged polymers, e.g., poly(vinylphosphonate), and a redox metal dopant, such as a molybdate, and to methods of making and using these, particularly in capacitors and other electronic devices.

Description of the Related Art

Interest toward flexible supercapacitors as energy storage devices has increased significantly in recent years because of the amendability of flexible supercapacitors to applications in wearable electronics, among other things. Such electrochemical devices may have fast charge-discharge rates, high power densities, low maintenance costs, and long cycle lifetimes. The energy density of supercapacitors can strongly depend on the composition of the electrolyte used.

Various aqueous electrolytes, such as $H_2SO_4$, KOH, or organic solvents (i.e., propylene carbonate), including salts, have been customarily used in the art. Non-aqueous solvents also have been extensively used in electric double layer capacitors (EDLCs), these electrolytes have some disadvantages, including high flammability, toxicity, and liquid leakage, etc. One proposed avenue for preparing more stable electrolytes, has involved replacing liquid electrolytes with electrolytes having better dimensional stability.

Gel polymer electrolytes (GPEs) comprising a host polymer and one or more dopants have been studied for increased dimensional stability. Gel electrolytes can retain stability even at high temperatures, without using an additional mechanical separator on a constructed device. However, the flammability of the GPE electrolytes is an important issue that should be addressed, especially at higher temperatures or during a destructive accident. Additional properties, such as ionic conductivities and broad electrochemical stability windows, present critical problems to be solved.

Recently, capacitance of the supercapacitors has been improved by redox reactions at the electrode-electrolyte interface upon addition of one or more redox mediators into a polymer matrix. In a typical case capacitance is increased by adding redox mediators, such as $K_3Fe(CN)_6$ or $K_4Fe(CN)_6$ in a KOH electrolyte, thereby leading to improved maximum capacitance values of 712 F/g in the $K_3Fe(CN)_6$—KOH electrolyte and 317 F/g in the $K_4Fe(CN)_6$—KOH electrolyte. Similarly, a capacitance improvement was observed for a carbon-based supercapacitor after adding KI to $H_2SO_4$, causing a capacitance enhancement from 472 F/g (without KI) to 912 F/g (with KI as mediator). The use of p-phenylenediamine as an organic mediator in $H_2SO_4$ has been reported to improve the capacitance of a supercapacitor from 144.1 F/g to 605.3 F/g. The specific capacitance and energy density of a supercapacitor was reported to increase by introducing $Na_2MoO_4$ into a polyvinyl alcohol (PVA)-$H_2SO_4$ gel, forming Mo(VI)/Mo(IV) redox couples in the PVA-$Na_2MoO_4$—$H_2SO_4$ gel electrolyte. Similarly, the capacitive effect of p-benzenediol in a PVA-$H_2SO_4$ electrolyte was reported to reach 474.29 F/g, far better than a PVA-$H_2SO_4$ system.

Research into capacitive performance of supercapacitors has not yet been widely reported for redox-mediated charged polymer-based gel polymer electrolytes such as PVPA. Charged polymers, e.g., phosphate-based electrolytes, may offer physical and/or chemical solutions to some of the above-mentioned drawbacks of gel polymer electrolyte (GPE) supercapacitors.

Phosphorus-comprising polymers have been gaining interest in many fields due to their flame resistance or inflammable character. This class of polymers may be functionalized either on the side chain or main chain, such as vinylphosphonates or polyphosphoesters. The phosphonate-linked monomer, vinylphosphonic acid (VPA), can yield poly(vinylphosphonic acid), PVPA, via polymerization. PVPA is an acidic polymer due to the phosphonic acid groups in its repeat unit, which may form an intrachain and interchain hydrogen bonding network. The conductivity of these polymer electrolytes may be increased by increasing of the concentration of phosphonic acid groups, by doping, and/or the copolymerization with other comonomers. Homopolymers and copolymers of VPA have been used as polymer electrolyte membranes, which are essential components of the fuel cell research.

US 2011/0272284 A1 by Elbick et al. (Elbick) discloses a process for treating the surface of a Cr, Cu, Mn, Mo, Ag, Au, Pt, Pd, Rh, Pb, Sn, Ni, Zn, and/or Fe-comprising metal substrate. Elbick applies an anodic potential to the metal surface in an electrolytic circuit of the metal surface, a cathode, and an electrolytic solution in contact with the metal surface and the cathode. Elbick's electrolytic solution may contain $PO_4^{3-}$, $RPO_3^{2-}$, $HPO_3^{2-}$, $R_2PO_2^-$, $NO_3^-$, $BO_3^{3-}$, $SiO_4^{4-}$, $MoO_4^{2-}$, $WO_4^{2-}$, $RCO_2^-$, and/or $^-O_2CCO_2^-$ anion, which may comprise a polymer having a pendent phosphate, phosphonate, phosphite, phosphinate, sulfate, sulfonate, and/or carboxylate moiety. Elbick describes polyvinyl phosphonic acid and polyacrylic acid, but does not describe adding metallic redox ions to its electrolyte, e.g., $(NH_4)_2MoO_4$, nor an amount in the range of 1.0-20.0 wt. % of the total weight of the gel electrolyte. Elbick's added salts, e.g., $Na_3PO_4$, $Na_4SiO_4$, $H_3PO_4$, $Na_3PO_3$, alkylphosphonates, alkylsulfates, etc., are for passivation of substrates with a protective anodic layer.

U.S. Pat. No. 4,554,216 to Mohr (Mohr) discloses a process for manufacturing support materials for offset-printing plates in two stages involving anodic oxidation in an aqueous electrolyte based on sulfuric acid, then in a different aqueous electrolyte. Mohr's different electrolyte has dissolved oxoanions of B, V, Mo, W, and/or C. Mohr does not disclose charged polymers, particularly poly(vinylphosphonic acid), nor a gel electrolyte. CN 102421525 A by Chung et al. (Chung), which also published as US 2012/0051999 A1 and US 2013/0004411 A1, discloses a catalyst comprising a polyelectrolyte multilayer thin film, in which metal particles are disposed on a carrier, to a method for producing same, and to a method for directly preparing hydrogen peroxide from oxygen and hydrogen using the catalyst. Chung's catalyst may use a cationic resin, anionic resin, and/or nonionic carrier, which may include poly (allylamine), polydiallyldimethylmonium, poly-(ethylenediamine), poly(acrylamide-co-diallyldimethylmonium), poly (4-styrenesulfonate), poly(acrylic acid), poly(acrylamide), poly(vinylphosphonic acid), poly(2-acrylamido-2-methyl-11-propanesulfonic acid), poly(anethole sulfonic acid), and/or poly(vinylsulfonate). Chung's dispersed metal may comprise Pd, Pt, Ru, Rh, Ir, Ag, Os, Ni, Cu, Co, and/or Ti. Chung does not particularly describe redox metals, such as molybdates, nor monolayers of electrolyte polymer.

U.S. Pat. No. 6,225,009 to Fleischer et al. (Fleischer) discloses a non-liquid electrolyte containing electrochemical cell which operates efficiently at room temperature. Fleischer's cell includes a non-liquid, proton-mobile electrolyte, a proton-donating organic anode active material or a two-oxidation state metallic anode active material, and a solid couple-forming cathode. Fleischer's electrolyte may use $H_2SO_4$, $CH_3SO_3H$, $HNO_3$, HF, HCl, $H_3PO_4$, $HBF_4$, $HClO_4$, $H_2SO_3$, $H_4P_2O_7$, and/or polyvinyl sulfonic and/or sulfuric acid. Fleischer's anodic active material may contain Sn, Ti, Cu, Al, W, Sb, Ir, Mo, Bi, and/or Cr. Fleischer's electrolyte may include various sulfonated polymers, waxes, or polyaromatics with a variety of vinyl polymers, including PVPA, but preferably PVA. Fleischer's cathodic active material may include molybdates, amount several. Fleischer's cells are generally asymmetric and Fleischer does not disclose a gel electrolyte of PVPA and ammonium molybdate.

Japan. J Appl. Phys. 2012, 51, 090121 by Kondo et al. (Kondo) discloses polyoxometalates immobilized on a boron-doped diamond (BDD) surface modified by allyltriethylammonium bromide (ATAB), then immersed in a phosphomolybdic acid ($H_3PMo_{12}O_{40}$). Kondo also describes polyoxometalate-modified BDD from phosphonic-acid-terminated BDD, obtained by modifying BDD with vinylphosphonic acid (VPA), followed by reacting surface phosphonic acid groups with ammonium molybdate to generate a lacunary phosphomolybdic acid (PMox) group. Kondo does not disclose a polymerization of the VPA, nor an electrolyte comprising PVPA, much less such an electrolyte comprising $(NH_4)_2MoO_4$ in a gel.

Int. J Corros. Scale Inhib. 2014, 3(1), 28-34 by Neofotistou et al. (Neofotistou) discloses inhibiting silica polycondensations using dendrimers based on polyaminoamide backbones with amine moieties as surface groups protonated to charge the dendrimer cationically. Neofotistou blends the cationic dendrimers with anionic polymers such as polyvinylphosphonic acid for silica scale inhibition. Neofotistou does not disclose any gel electrolyte, nor capacitors, electrolytes comprising molybdates.

Appl. Organomet. Chem. 2011, 25(2), 128-132 and Inorg. Chem. Comm. 2011, 14(3), 497-501 by Hu et al. (Hu) disclose heterogeneous catalysts for olefin epoxidation obtained by grafting diamines on organic polymer-inorganic hybrid material, Zr poly (styrene-phenylvinyl-phosphonate)-phosphate (ZPS-PVPA), and subsequently coordinating with Schiff base Mo(VI) complexes. Hu does not pertain to capacitors, nor does Hu use PVPA gel electrolytes comprising redox metals.

In light of the above, a need remains for electrolyte materials, particularly for capacitors and preferably flexible capacitors, which may take advantage of the properties of charged polymers, such as PVPA, and redox mediators, such as molybdates and similarly situated materials, particularly for storing energy, as well as methods of making such materials and capacitors.

SUMMARY OF THE INVENTION

Aspects of the invention provide electrolytes, which may comprise: poly(vinylphosphonic acid); and a redox mediator in an amount in a range of from 1.0 to 20.0 wt. % of a total electrolyte weight, wherein the electrolyte is preferably in gel form. Such electrolytes can be modified by any permutation of the features described herein, particularly the following.

The redox mediator may comprise a metal and/or a metalloid. The redox mediator may comprise at least 75 wt. % of Mo, Cr, Ti, Zn, Ni, Rh, Ru, Os, Pd, Ce, W, Ta, Nb, V, Co, Mn, and/or Fe, relative to a total elemental metal weight in the redox mediator, preferably Mo, such as molybdate(s). The redox mediator may comprise $(NH_4)_2MoO_4$, e.g., in an amount of from 7.5 to 17.5 wt. % of the total electrolyte weight.

Aspects of the invention provide capacitors, which may comprise: a first electrically conducting layer; an electrolyte layer of any permutation of inventive electrolyte described herein; and a second electrically conducting layer, wherein the electrolyte layer is sandwiched between the layers of electrically conducting materials. Inventive capacitors may be symmetric. Such capacitors can be modified by any permutation of the features described herein, particularly the following.

The first and/or second electrically conductive layer may comprise at least 50 wt. % activated carbon, relative to a total weight of the electrically conductive layer. The first and/or second electrically conductive layer may comprise conductive carbon in an amount of from 5 to 25 wt. %, relative to a total weight of the electrically conductive layer. The first and/or second electrically conductive layer may comprise no more than 33 wt. % of a binder, relative to a total weight of the electrically conductive layer. The first and/or second electrically conductive layer may consist essentially of activated carbon, conductive carbon, and binder.

Inventive capacitors may maintain at least 85% of its specific capacitance in a 60° bent and/or twisted state, relative to a flat state. Inventive capacitors may comprise outer layers of aluminum, silver, gold, and/or copper. Inventive capacitors may have a specific capacitance in a range of from 1000 to 1500 F/g, and/or an energy density in a range of from 150 to 210 Wh/Kg at power density of 500 W/kg.

Aspects of the invention provide methods of storing energy. Such methods may comprise: flowing current through a gel electrolyte layer comprising poly(vinylphosphonic acid) and a redox mediator in an amount in a range of from 1.0 to 20.0 wt. % of a total electrolyte layer weight.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14 shows galvanostatic charge-discharge (GCD) curves of PVPA and an exemplary inventive PVPA/Mo10 material;

FIG. 15C shows galvanostatic charge-discharge (GCD) curves of an exemplary PVPA/Mo10 material under varied current;

FIG. 20 shows plots indicative of the stability of the exemplary inventive supercapacitors measured at a current density of 1 mA;

DETAILED DESCRIPTION OF THE PREFERRED EMBODIMENTS

Figure 1:
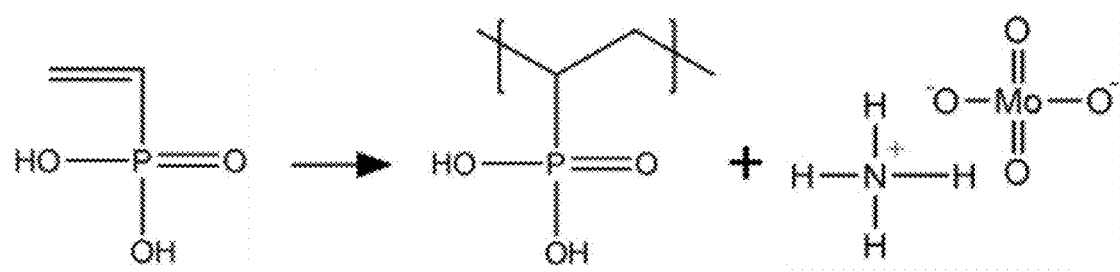
FIG. 1 shows a representative synthetic scheme for the polymerization of poly(vinylphosphonic acid), PVPA.

Aspects of the invention provide electrolytes, which may comprise: poly(vinylphosphonic acid), for example, in an amount of at least 25, 33, 40, 45, 50, 55, 60, 65, 70, or 75 wt. % and/or up to 50, 60, 70, 75, 80, 85, 90, 95, 97.5, or 99 wt. %, of the total electrolyte weight; and a redox mediator in an amount in a range of from 1.0 to 20.0 wt. %, e.g., at least 1, 1.5, 2, 2.5, 3, 3.5, 4, 4.5, 5, 5.5, 6, 6.5, 7, 7.5, 8, 8.5, 9, 9.5, or 10 wt. % and/or up to 20, 19.5, 19, 18.5, 18, 17.5, 17, 16.5, 16, 15.5, 15, 14.5, 14, 13.5, 13, 12.5, 12, 11.5, 11, 10.5, or 10 wt. %, of the total electrolyte weight, wherein the electrolyte is preferably in gel form.

The term poly(vinylphosphonic acid), i.e., PVPA, may include analogs, of PVPA, such as poly(vinylphosphonates) and/or poly(vinylphosphine oxides). Useful PVPAs may have a Brookfield viscosity (1% solution in $H_2O$) of at least 0.75, 0.8, 0.85, 0.9, 0.95, 1, 1.05, 1.1, 1.15, 1.2, 1.25, 1.3, 1.35, 1.4, 1.45, or 1.5 cps and/or up to 1.5, 1.45, 1.4, 1.35, 1.3, 1.25, 1.2, 1.15, 1.1, 1.05, or 1 cps. Useful PVPAs may include copolymers of VPA with, e.g., acrylic acid, methacrylic acid, acrylonitrile, acrylamide, vinyl pyrrolidone, ethylene, vinylsulfonic acid, styrene, vinyl chloride, TFE, VDF, HFP, vinyl alcohol, vinyl acetate, and/or propylene, e.g., as described in *Macromolecules* 2016, 49, 2656-2662, *Polym. Chem.* 2013, 15(4), 4207-4218, *Macromol. Rapid Comm.* 2006, 27(20), 1719-1724, each of which is incorporated by reference herein in its entirety. Charged, particularly anionically charged, polymers may be used in place of or to supplement the PVPA. The PVPA may be obtained indirectly, e.g., by polymerizing monomers like vinyl phosphonyl chloride or vinyl phosphonyl esters, which may be subsequently hydrolyzed or otherwise converted to PVPA. The PVPA, analog, or comonomer may be obtained by reversible addition fragmentation (RAFT), as described in the doctoral thesis entitled "Synthesis and Characterization of Poly(vinylphosphonic acid) for Proton Exchange Membranes in Fuel Cells" submitted by Bahar Bingoel at the Johannes Gutenberg-Universität in Mainz in 2007, which is incorporated by referenced herein in its entirety. Useful polymers may have a molecular weight (Mn) of, e.g., at least 5, 6, 7, 7.5, 8, 8.5, 9, 9.25, 9.5, 9.75, 10, 10.5, 11, 12.5, 15, 20, or 25 kDa and/or up to 400, 375, 350, 325, 300, 275, 250, 225, 200, 175, 150, 125, 100, 90, 80, 75, 70, 65, 60, 55, 50, 45, 40, 35, 30, 27.5, 25, 22.5, 20, 17.5, or 15 kDa. Relevant polymers may have a polydispersity index (PDI) in a range of, e.g., at least 1.05, 1.1, 1.15, 1.2, 1.25, 1.33, 1.5, 2, 2.5, 3, 3.5, or 4 and/or up to 10, 9, 8, 7.5, 7, 6.67, 6.33, 6, 5.75, 5.5, 5.25, 5, 4.75, 4.5, 4.25, 4, 3.75, 3.67, 3.5, 3.33, 3.25, or 3.

The electrolyte will preferably behave as a gel, and may have properties like a Bingham fluid, a non-flowing non-solid, or an elastomer. Gel, as used herein, can mean viscoelastic materials generally which may optionally also lack thixotropy and/or thermoplasticity. The gel nature may rely on the polyionic nature of the polymers used, such as PVPA, with ionic functional groups, such as —$CO_2^-$, —$SO_3^-$, and/or —$PO_3^{2-}$. The ionic charges can prevent the formation of tightly coiled polymer chains, unlike customary uncharged polymers or lightly charged polymers. Such uncoiled nanomorphology can allows the polymers to contribute more to viscosity in their stretched state, because the stretched-out polymer takes up more space. The charging on useful charged polymers within the scope of the invention may include at least 25, 33.3, 40, 50, 55, 65, 75, 85, 80, 85, 90, 92.5, 95, 97.5, 98, 99, 99.1, 99.5, 99.9, 99.99 or even 100% of the monomers containing a charged unit. Certain applications may call for 1, 1.25, 1.5, 1.75, 2, 2.25, 2.5 or more charges per monomer. Gels may be based on a polymer network formed through the physical aggregation of polymer chains, caused by one or more of hydrogen bonds, crystallization, helix formation, complexation, etc., resulting in regions of local order acting as the network junction points. Some such swollen networks may be thermoreversible gels if the regions of local order are thermally reversible. The gel may be a hydrogel, i.e., a gel in which the gelling agent is water. Useful gels may have mechanical properties as described in *J Appl. Polym. Sci.* 2001, 81(4), 948-956, *J Power Sources* 2014, 245, 830-835, *J Power Sources* 2018, 406, 128-140, *Bull. Mater. Sci.* 2003, 26(3), 321-328, and/or *Solid State Ionics* 1996, 85(1-4), 51-60, each of which is incorporated by reference herein it its entirety.

The redox mediator may comprise a metal and/or a metalloid. The redox mediator may comprise at least 75, 80, 85, 90, 91, 92, 92.5, 93, 94, 95, 96, 97, 97.5, 98, 99, 99.1, 99.5, or 99.9 wt. % of Mo, Cr, Ti, Zn, Ni, Rh, Ru, Os, Pd, Ce, W, Ta, Nb, V, Co, Mn, and/or Fe, relative to a total elemental metal weight in the redox mediator, preferably Mo. Examples of forms such metals or metalloids may take could be oxides, salts, and/or coordination complexes, for example, molybdate(s), tungstate(s), titanate(s), niobate(s), vanadate(s), manganate(s), permanganae(s), chromate(s), dichromate(s), selenate(s), cobaltate(s), titanium oxide(s), zinc oxide(s), copper oxide(s), iron oxide(s), tin oxide(s), zirconium oxide(s), nickel oxide(s), osmium oxide(s), and/or cerium oxide(s). Redox mediator complexes may comprise any of the relevant aforementioned metals and 1,10-phenanthroline (phen), 4,4'-di-tertbutyl-2,2'-bipyridine (dtb), bipyridyl (bipy), hydrate, CO, CN, SCN, ammonia, chloride, 2,2'-ethylenebis(nitrolomethylidene)diphenol-N,N'-ethylenebis(salicylimine) (salen), 2,4-di(pyrazol-1-yl)-1,3,5-triazine (bpt), quinquepyridine (qpy), 2,6-bis (1'-butyl-benzimidazol-2'-yl) pyridine (dbbip), 2,9-dimethy-1,10-phenanthroline (dmp), 3,4-ethylenedioxythiophene (EDOT), 4'-(3,4-ethylenedioxythiophene-2,2':6',2"-ter-pyridine (EtPy), 4,4',6,6'-tetramethyl-2,2'-bipyridine (tmby), 1-bis(2-pyridyl)ethane (bpye), [(−)-sparteine-N,N']-(maleonitrile-dithiolato-S,S') (SP)(mmt), acetylacetone (acac), 4,4-difluoro-1-phenylbutanate-1,3-dione ($CF_2$), dibenzoylmethanate (dbm), tetradentate diaminodiphenolate (hybeb), and/or terpyridine (tpy or terpy), etc., and mixtures of these, including mixed ligand complexes and multi-metal optionally mixed ligand complexes. Salts of relevant redox mediators may include ammonium, sodium, lithium, magnesium, potassium, and/or tetraalkylammonium (e.g., $(CH_3)_4N^+$, $(CH_3CH_2)_4N^+$, $((CH_3)_2CH)_4N^+$, etc.). Exemplary redox mediators may be, e.g., $(NH_4)_2MoO_4$, $TiO_2$, $SrTiO_3$, $SnO_2$, ZnO, $WO_3$, $V_2O_5$, CuO, $Fe_2O_3$, $Os(bipy)_3$, $Ru(bipy)_3$, $(bipy)_2$ $Ru(qpy)_3Ru(bipy)_2$, $(bipy)_2Os(qpy)_2Os(bipy)_2$, $(bipy)_2Ru(qpy)_2Ru(bipy)_2$, $(bipy)_2Os(qpy)_1Os(bipy)_2$, $(bipy)_2Ru(qpy)_1Ru(bipy)_2$, $(bipy)_2Ru(bpt)Ru(bipy)_2$, $(bipy)_2$ $Os(bpt)Ru(bipy)_2$, $(bipy)_2Ru(bpt)Os(bipy)_2$, $(bipy)_2$ $Os(pytr-bipy)Ru(bipy)_2$, $(bipy)_2Ru(pytr-bipy)Os(bipy)_2$, $(bipy)_2Ru(pytr-bipy)Ru(bipy)_2$, $Co(bpy)_3$, $Co(bpy)_3$, $Co(terpy)_3$, $Co(dbbip)_2$, $Co(phen)_3$, $Co(EtPy)_2$, $Co(dtb)_2$, $Cu(dmp)_2$, $Cu(SP)(mmt)$, $Cu(phen)_2$, $Cu(bpy-(COOEt)_2)_2$, $Cu(bpy-(COOnbut)_2)_2$, $Cu(bpy-(COOtbut)_2)_2$, $Cu(bpye)_2$, $Cu(tmby)_2$, $Fe(CN)_6$, $Fe(phen)_3$, $Fe(bipy)_3$, $NiFe(CN)_6$, $Br_2Fc$ (ferrocene di-mono-bromide), BrFc, EtFe, $Et_2Fc$, $Me_{10}Fc$, Ni-bis(dicarbollide), $Mn(acac)_3$, $Mn(CF_2)_3$, $Mn(dbm)_3$, $Mn(pzTp)_2$, $Mn(Tp)_2$, $Mn(Tp^*)_2$, VO(hybeb), and/or VO(salen). The redox mediator may comprise $(NH_4)_2MoO_4$, and/or any other relevant redox mediator, in an amount of from 7.5 to 17.5 wt. % of the total electrolyte weight, e.g., at least 5, 6, 6.5, 7, 7.5, 8, 8.5, 9, 9.5, 10, 10.5, 11, 11.5, 12, or 12.5 wt. % and/or up to 18, 17.5, 17, 16.5, 16, 15.5, 15, 14.5, 14, 13.5, 13, 12.5, 12, 11.5, 11, 10.5, or 10 wt. %.

Aspects of the invention provide capacitors, which may comprise: a first electrically conducting layer; an electrolyte layer of any permutation of inventive electrolyte described herein; and a second electrically conducting layer, wherein the electrolyte layer is sandwiched between the layers of electrically conducting materials. Inventive capacitors may be symmetric, i.e., having mirror image structure about a central plane in the direction of the layering. Inventive capacitors may preferably comprise only a single (gel) electrolyte layer, or 2, 3, 4, 5, 6, 7, 8, 9, 10, or more layered (gel) electrolyte layers, alternating with (e.g., elemental carbon-based) electrically conducting layers. The gel layer may be embedded in a mesh layer such that it is a composite gel layer or reinforced gel layer. That is, a support material such as a mesh layer, screen, and/or film, including, for example aluminum, gold, copper, silver, and/or solid polymer, may support as a platform upon which the gel rests and/or as sandwiching surfaces on opposing sides of the gel. In certain applications, such mesh layers may be embedded in the gel.

The first and/or second electrically conductive layer may comprise at least 50, 60, 70, 75, 80, 85, 90, or 95 wt. % and/or up to 99, 97.5, 95, 92.5, 90, 87.5, 85, 82.5, 80, 77.5, or 75 wt. % activated carbon, relative to a total weight of the electrically conductive layer. The activated carbon may comprise thermal black, furnace black, lamp black, and/or carbon aerogel. The activated carbon may be a powdered, granular, extruded, bead, impregnated, polymer-coated, and/or woven. The activated carbon may be carbonized under N2 and/or Ar at a temperature of, e.g., at least 500, 575, 600, 625, 650, 675, 700, 725, 750, 775, 800, 825, 850, 875, or 900° C. and/or up to 1000, 975, 950, 925, 900, 875, 850, 825, 800, 775, 750, 725, or 700° C., and/or activated/oxidized under steam, air, and/or 02 at a temperature of, e.g., at least 850, 875, 900, 925, 950, 975, 1000, 1025, 1050, 1075, 1100, 1125, 1150, 1175, and/or 1200° C. and/or up to 1300, 1275, 1250, 1225, 1200, 1175, 1150, 1125, 1100, 1075, 1050, 1025, 1000, 975, 950, 925, 900, 875, or 850° C., and/or chemically activated, e.g., by phosphoric acid 25%, potassium hydroxide 5%, sodium hydroxide 5%, calcium chloride 25%, or zinc chloride 25%, at a temperature of, e.g., no more than 650, 625, 600, 575, 550, 525, 500, 475, 450, 425, 400, 375, 350, 325, 300, 275, 250, 225, or 200° C. The activated carbon may have a BET specific surface area of, e.g., at least 500, 550, 600, 650, 700, 750, 800, 850, 900, 950, 1000, 1125, 1250, 1375, 1500, or 1750 m$^2$/g and/or up to 3500, 3250, 3000, 2900, 2800, 2750, 2700, 2600, 2500, 2400, 2300, 2250, 2200, 2150, 2100, 2050, 2000, or 1750 m$^2$/g. Relevant activated carbons may have an iodine number of, e.g., at least 450, 500, 550, 600, 650, 700, 750, 800, or 850 mg/g and/or up to 1250, 1200, 1175, 1150, 1125, 1100, 1075, 1050, 1025, 1000, 975, 950, 925, 900, 875, 850, 825, 800, 775, or 750 mg/g.

The first and/or second electrically conductive layer may comprise conductive carbon in an amount of from 5 to 25 wt. %, relative to a total weight of the electrically conductive layer, e.g., at least 5, 6, 7, 7.5, 8, 8.5, 9, 9.5, 10, 11, or 12.5 wt. % and/or up to 25, 22.5, 20, 17.5, 15, 14, 13, 12.5, 12, 11.5, 11, 10.5, 10, 9, or 8 wt. %. The conductive carbon may comprise primary carbon, such as carbon black, which is generally amorphous and/or agglomerated, not graphite, coke, or diamond. Useful conductive carbon may comprise carbon black having an average particle size of, e.g., at least 10, 12.5, 15, 17.5, 20, 22.5, 25, 27.5, or 30 nm and/or 100, 95, 90, 85, 80, 75, 70, 65, 60, 55, or 50 nm, and/or may have an average surface particle size of, e.g., 20, 25, 50, 75, 100, 125, 150, 175, 200, 250, 300, 350, 400, 450, 500, 600, or 750 $m^2/g$ and/or 1500, 1400, 1300, 1250, 1200, 1150, 1100, 1050, 1000, 950, 900, 850, 800, or 750 $m^2/g$.

The first and/or second electrically conductive layer may comprise no more than 33, 30, 27.5, 25, 22.5, 20, 19, 18, 17.5, 17, 16, 15, 13.3, 12.5, 12, 11, 10, 9, 8, 7.5, 7, 6, or 5 wt. % and/or at least 1, 2, 2.5, 3, 4, 5, 7.5, or 10 wt. %, of a binder, relative to a total weight of the electrically conductive layer. Useful binders may include, for example, poly(vinylidene difluoride) (PVdF), polytetrafluoroethylene (PTFE), styrene butadiene rubber (SBR), carboxymethyl cellulose (CMC optionally as a salt, e.g., Na, K, Li, or the like), polyacrylic acid, polyethylene glycol (PEG), polyacrylonitrile, polystyene, polyurethane, polyisoprene, polyethylene, polypropylene, ethylene propylene diene monomer (EPDM) rubber, poly(vinyl butyral), poly(vinyl acetate), poly(butyl acrylate), poly(methyl acrylate), chitosan, alginate, pectine, amylose, xanthan gum, gum arabic, gellan gum, Carrageenan, karaya gum, cellulose, guar gum, Tara gum, Tragacanth gum, gelatine, and/or caseinate.

The first and/or second electrically conductive layer may consist essentially of activated carbon, conductive carbon, and binder, in any permutation described herein, i.e., have no less than 10, 7.5, or 5% of the specific capacitance in flat state without further components. Inventive capacitors may consist essentially of such first and/or second electrically conductive layers and a gel electrolyte in any permutation described herein.

Inventive capacitors may maintain at least 85, 90, 91, 92, 92.5, 93, 94, 95, 96, 97, 97.5, 98, 99, 99.1, 99.5, or 99.9% of its specific capacitance in a 30, 45, 50, 55, 60, 65, 70, 75, 90° or more bent and/or twisted state, relative to a flat state. Inventive capacitors may comprise outer layers of aluminum, silver, gold, and/or copper. Inventive capacitors may have a specific capacitance in a range of from 1000 to 1500 F/g, e.g., at least 900, 950, 1000, 1050, 1100, 1150, 1175, 1200, 1225, 1250, 1275, 1300, or 1325 F/g and/or up to 1500, 1475, 1450, 1425, 1400, 1375, 1350, 1325, 1300, 1275, 1250, 1225, or 1200 F/g. Inventive capacitors may have an energy density in a range of from 150 to 210 Wh/kg, e.g., at least 150, 155, 160, 165, 167.5, 170, 172.5, 175, 177.5, 180, 182.5, 185, 187.5, or 190 Wh/kg and/or up to 210, 205, 202.5, 200, 197.5, 195, 192.5, 190, 187.5, 185, 182.5, or 180 Wh/kg, at power density of 500 W/kg.

Aspects of the invention provide methods of storing energy. Such methods may comprise: flowing current through, or developing a charge separation across, a gel electrolyte layer comprising a charged polymer, such as poly(vinylphosphonic acid), and any redox mediator(s) described herein, preferably comprising a molybdate, in an amount in a range of from 1.0 to 20.0 wt. % (or any percentage described herein) of a total electrolyte layer weight.

Inventive charged polymers may exclude acrylics, such as polyacrylate, polymethacrylate, etc., or may comprise no more than 15, 10, 7.5, 5, 4, 3, 2, 1, or 0.5 wt. %, relative to the total electrolyte polymeric weight, of any such acrylics, alone or in combination.

Inventive capacitors may exclude Li, Na, K, Rb, Cs, Mg, Ca, Sr, Ba, Zn, Cu, Sn, Zr, Cr, Pd, Pt, Ru, Rh, Ir, Ag, Os, Ni, Co, Ti, Sn, W, Sb, Mo, Bi, Cd, Pb, Se, Ta, V, Hf, Nb, and/Al, or may contain no more than 5, 4, 3, 2.5, 2, 1, 0.5, 0.1, 0.01, 0.001, 0.0001, or 0.00001 wt. %, relative to total elemental metallic weight, of any of these, individually or in combination. Inventive capacitors may exclude salts comprising sulfate, citrate, gluconate, nitrate, phosphate, phosphite, orthophosphate, silicate, selenate, tunstate, fluoride, chloride, bromide, iodide, carbonate, and/or bicarbonate, or may contain no more than 5, 4, 3, 2.5, 2, 1, 0.5, 0.1, 0.01, 0.001, 0.0001, or 0.00001 wt. %, relative to total electrolyte weight, of any of these, individually or in combination.

Inventive electrolytes may exclude sugars, polyols, and/or polysaccharides, e.g., maltose, digitonin, amygdalin, sucrose, pentaerythritol, glucose, cellobiose, mannose, inositol, starch, lactose, heparin, arabitol, dextrin, arabinose, erythritol, fructose, chitin, chitosan, gallactose, mannose, glucopyranose, tripentaerythritol, sorbitol, amylopectin, sorbitan (stearate), neuraminic acid, verbascose, threose, turanose, amylose, tagatose, trophanthobiose, sorbose, scillabiose, ribose, ribulose, rhamnose, raffinose, quinovose, quercitol, psicose, primeve rose, xylitol, xylose, naringin, mycosamine, muramic acid, methylglucoside, melezitose, melibiose, lyxose, lentinan, lactulose, inulin, hyalobiuranic acid, heptulose, guaran, glucosamine, gluconic acid, gluconolactone, gitonin, idose, fucose, and/or chondrosine, or may contain no more than 5, 4, 3, 2.5, 2, 1, 0.5, 0.1, 0.01, 0.001, 0.0001, or 0.00001 wt. %, relative to total electrolyte weight, of any of these, individually or in combination.

Inventive electrolytes may exclude sulfuric acid, phosphoric acid, molybdophosphoric acid, tungstophosphoric acid (TPA), sulfonated wax, polyvinylsulfonic acid, polyvinylphosphoric acid, sulfonated polyolefins, polyvinyl sulfuric acid, sulfonated polystyrene, sulfonated phthalocyanine, sulfonated porphyrin, poly-2-acrylamido-2-methylpropanesulfonic acid, polyacrylic acid, and/or polymethacrylic acid, or may comprise no more than 40, 33, 25, 20, 15, 10, 7.5, 5, 4, 3, 2.5, 2, 1, 0.5, 0.1, 0.01, 0.001, 0.0001, or 0.00001 wt. % of these individually or in combination, relative to the total electrolyte weight.

Inventive electrolytes may exclude polyethylene oxide, polyvinyl acetate, polyacrylamide, polyethyleneimine, poly (vinyl pyrrolidone), poly(2-vinylpyridine), poly(4-vinylpyridine), polyvinylidene fluoride, polyhydroxyethylene, poly-2-ethyl-2-oxazoline, phenol formaldehyde resin, polyacrylamide, poly-N-substituted acrylamide, poly-N-vinylimidazole, agar, and/or agarose, or may comprise no more than 40, 33, 25, 20, 15, 10, 7.5, 5, 4, 3, 2.5, 2, 1, 0.5, 0.1, 0.01, 0.001, 0.0001, or 0.00001 wt. % of these individually or in combination, relative to the total electrolyte weight.

Inventive electrolytes may exclude quinone compounds, e.g., hydroquinone monomethyl ether, hydroxy acetophenone, hydroxybenzaldehyde, hydroxy benzoic acid, hydroxybenzonitrile, acetaminophen, hydroxybenzyl alcohol, hydroxycinnamic acid, methylparabin, 2,5-dihydroxy-1,4-benzoquinone, resorcinol, ascorbic acid, ascorbic acid derivative, 1,4-dihydroxy benzene, 3-hydroxy tyramine (dopamine), rhodizonic acid, co-enzyme Q, 1,2,3-trihydroxy benzene (pyrogallol), 1,3,5-trihydroxy benzene (phloroglucinol), tetrahydroxy quinone (THQ), tetrahydroxy acetophenone, tetrahydroxy benzoic acid, hexahydroxy benzene, tetrahydroxy quinone, hexahydroxybenzene, chloranilic acid, chloranilic acid, chloranil, rhodizonic acid, fiuoroanilic acid, reduced fluoroanilic acid, fluoranil, duroquinone, 1-nitroso-2-napthol, martius yellow, hydroxy-1,4-naphthaquinone, naphthalene diol, tetrahydroxy napthalene, tetrahydroxy 1,4-naphthaquinone, echinochrome, pentahydroxy 1,4-naphthaquinone, anthranol, hydroxy anthraquinone, anthralin, anthrarufin, alizarin, di-hydroxyanthraquinone, anthrobin, anthragallol, purpurin, 1,8,9-anthracenetriol, 1,2, 5,8-tetrahydroxyanthraquinone, carminic acid, purpogallin, hydroxybenzophenone, hydroquinone monobenzylether, hydroxy biphenyl, 2,2,4,4-tetrahydroxy benzophenone, phenolphthalein, indophenol, bromophenol blue, methylenedigallic acid, methylenedisalicyclic acid, 5-hydroxy-2(5H)-furanone, hydroxycourmarin, fustin, hydroxindole, tetrahydropapaveroline, oxindole, o-phenanthroline, phenanthridine, 6(5H)phenanthridinone, hydroxyjulolidine, citrazinic acid, uracil, 2-amino-5-bromopyridine, 5-aminotetrazole monohydrate, 2-aminothiazole, 2-aminopyrimidine, 2-amino-3-hydroxypyridine, 2,4,6-triaminopyrimidine, 2,4-diamino-6-hydroxy pyrimidine, 5,6-diamino-1,3-dimethyluracil hydrate, 5,6-diamino-2-thiouracil, cyanuric acid, and/or hydroxy methyl pyridine, or may comprise no more than 5, 4, 3, 2.5, 2, 1, 0.5, 0.1, 0.01, 0.001, 0.0001, or 0.00001 wt. % of these individually or in combination, relative to the total electrolyte weight.

Aspects of the invention introduce molybdate salts, such as ammonium molybdate, into PVPA and/or use Mo as redox mediator in PVPA at various concentrations to obtain hydrogels, PVPA/MoX, e.g., 1, 2, 2.5, 3, 4, 5, 6, 7, 7.5, 8, 9, or 10 wt. % and/or up to 30, 25, 22.5, 20, 19, 18, 17.5, 17, 16, 15, 14, 13, 12, 11, 10, 9, 8, or 7.5 wt. %. Supercapacitors including such PVPA/MoX materials may also use activate carbon (AC) electrodes.

Aspects of the invention may comprise rational designs of supercapacitors, particularly comprising redox-mediated electrolyte, for example, PVPA/MoX and optionally using an active carbon electrode. Inventive hydrogels can be prepared with different weight percentages of Mo in PVPA or similar polymer matrices, e.g. ranging from at least 1, 2, 3, 4, 5, 6, 6.5, 7, 7.5, 8, 8.5, 9, 9.5, 10, 10.5, 11, 11.5, 12, or 12.5 wt. % and/or up to 50, 45, 40, 35, 33.3, 30, 27.5, 25, 22.5, 20, 19, 18, 17.5, 17, 16.5, 16, 15.5, 15, 14.5, 14, 13.5, 13, 12.5, 12, 11.5, 11, 10.5, or 10 wt. %. Aspects of the invention may include enhancing pseudocapacitance and/or sustaining electrical double layer capacitance by doping charged polymers with particular metal ions and/or oxides, for example, of Mo, W, Cr, V, Nb, Ta, Mn, Co, etc., such as molybdate, tunstate, vanadate, cobaltate, (per)manganate, and the like.

Aspects of the invention may provide improved electric double layer capacitance and/or pseudocapacitance, e.g., to increase the discharge time at least 25, 30, 35, 40, 42.5, 45, 47.5, 50, 52.5, 55, 57.5, 60, 62.5, 65, 67.5, 70, 75, 80, 85, 100-fold or more relative to the pure charged polymer matrix and/or polyelectrode, such as poly(vinylphosphonic acid), PVPA. Inventive capacitors may sustain a capacitance of at least 1276 F/g, e.g., at least 1000, 1025, 1050, 1075, 1100, 1125, 1150, 1175, 1200, 1225, 1250, 1275, 1300, 1325, 1350, 1375, or 1400 F/g, and/or up to 2000, 1950, 1900, 1850, 1800, 1750, 1700, 1650, 1600, 1550, or 1500 F/g. Inventive capacitors may limit loss to no more than 20, 19, 18, 17.5, 17, 16, 15, 14, 13, 12.5, 12, 11, 10% or less loss, e.g., after at least 1750, 2000, 2100, 2150, 2200, 2250, 2300, 2350, 2400, 2500, 2750, 3000, or 3500 cycles and/or up to 10000, 7500, 7000, 6500, 6000, 5500, 5000, 4750, 4500, 4250, 4000, 3750, or 3500 cycles.

Inventive supercapacitors may employ PVPA with, e.g., 10±0.1, 0.5, 0.75, 1, 1.5, 2, 2.5, 3, 4, 5, 6, or 7.5 wt. % Mo. Inventive supercapacitors may have an energy density around 180.2 Wh/kg, e.g., at least 160, 162.5, 165, 167.5, 170, 172.5, 175, 177.5, 178, 179, 180, 181, 182, 182.5, 183, 184, or 185 Wh/kg and/or 200, 197.5, 195, 192.5, 190, 187.5, 185, 184, 183, 182.5, 182, 181, 180, 179, 178, 177.5, 177, 176, or 175 Wh/kg, at power density of 500±2.5, 5, 10, 15, 25, 35, 50, 75, 100, or 150 W/kg. Inventive supercapacitors may be flexible, and/or may be suitable for twisting, e.g., at least 1, 2, 3, 6, 9, 12, 15, 18, 21, 24, 27, 30, 45, or 60° and/or up to 180, 150, 120, 90, 75, 60, 45, 42, 39, 36, 33, or 30° torsionally about a hypothetical central axis, and bent states, e.g., at least 3, 6, 9, 12, 15, 18, 21, 24, 27, 30, 45, 60, 75, or 90° and/or up to 180, 150, 120, 90, 60, 45, 42, 39, 36, 33, or 30°. Aspects of the invention may provide supercapacitors comprising such redox doped, charged polymers.

EXAMPLES

Materials: Alpha,alpha'-azodiisobutyramidine dihydrochloride (AIBHC, >98% Fluka), vinylphosphonic acid (>97%, Aldrich). Polyvinylidene fluoride (HSV 900 PVDF) (MTI), activated carbon (AC), and conductive carbon (CC) (MTI), conductive additive (Timical super C65 application) (MTI). Ethanol and 1-methyl-2-pyrrolidone (NMP) were received from Merck.

Electrode and Electrolyte Preparation: Poly(vinylphosphonic acid) was synthesized as described in *J. Non-Cryst. Solids* 2008, 354(30), 3637-3642, which is incorporated by reference herein in its entirety, whereby the monomer, vinyl phosphonic acid (VPA) was free radical polymerized to produce PVPA. The polymerization was carried out using an initiator, azodiisobutyramidine dihydrochloride (0.1 mol. %), at 70° C. for 3 hours. After the polymerization, the homopolymer was purified. Polymerizations can be carried out by any manner known in the art.

Redox mediator, ammonium molybdate was introduced into the polyelectrolyte, PVPA, at various weight fractions in aqueous solution. The hydrogels were abbreviated as PVPA/MoX, X being the weight percentage of Mo in the PVPA, with samples ranging from 1 to 20%.

Fabrication of Supercapacitor Electrodes: The supercapacitor electrodes were made containing activated carbon (CA—Kuraray active carbon for supercapacitor electrode MTI), conductive carbon (CC—Timical super 65, conductive additive for Lithium ion batteries), and binder PVDF at various contents. A slurry including 80 wt. % CA, 10 wt. % CC, and 10 wt. % PVDF were prepared by mixing at 70° C. After homogenization, the mixture was cast onto an aluminum mesh foil using an MRX automatic coating machine (Shenzhen Automation Equipment). Finally, the electrode was dried in an oven at 80° C.

Fabrication of Flexible Supercapacitor Devices: Supercapacitor devices were assembled with a structure: Al/AC+CC/PVPA/MoX/CC+AC/Al, i.e., aluminum, activated carbon/conductive carbon/binder, Mo-doped PVPA, conductive carbon/activated carbon/binder, aluminum. PVPA/MoX hydrogels were cast onto the surface of AC+CC electrodes. Supercapacitor cells were placed in SWAGELOK® cell kit for electrochemical testing.

Cyclic voltammetry (CV) studies was performed by using Palmsens EmStat$^3$ electrochemical analyzer. The CV traces of supercapacitor cells were evaluated in the potential range of 0.0 to 1 V at different scan rates, ranging from 10 to 400 mV/s. Galvanostatic charge-discharge (GCD) experiments were carried out by MTI battery analyzer at the current densities 1 to 10 A/g and cut off voltage 0.1 to 1 V.

The device specific capacitances ($C_s$) of the symmetrical supercapacitors were calculated based on the Equation 1, below, with current density increasing from 1 to 10 A/g:

$$C_s = 2 \cdot I \cdot \Delta t / m \cdot \Delta V \qquad \text{Eq. 1,}$$

wherein $\Delta V$ is voltage difference in discharge, I is discharge current, $\Delta t$ is discharge time, and m is the mass of the electrode active material.

Energy and power densities of symmetric supercapacitors were calculated based on Equations 2 and 3, below:

$$E = (\tfrac{1}{2} \cdot C_s \cdot (\Delta V^2))/3.6 \qquad \text{Eq. 2, and}$$

$$P = E \cdot (3600/\Delta t) \qquad \text{Eq. 3,}$$

wherein E is energy density, P is power density, $\Delta V$ is voltage window, and $\Delta t$ is discharge time.

Referring now to the drawings, wherein like reference numerals designate identical or corresponding parts throughout the several views.

FIG. 1 shows a representation of the preparation of the polyelectrolyte, poly(vinylphosphonic acid) (PVPA), polymerized from vinylphosphonic acid (VPA) monomer, whereafter the dopant, e.g., a Mo compound (or any described above), can be incorporated into the matrix, e.g., PVPA (or any described above), in a desired weight percentage to obtain hydrogels including redox active metal ions. It is not precluded that the dopant be included in the monomer mixture insofar as this does not inhibit the polymerization.

Figure 2:
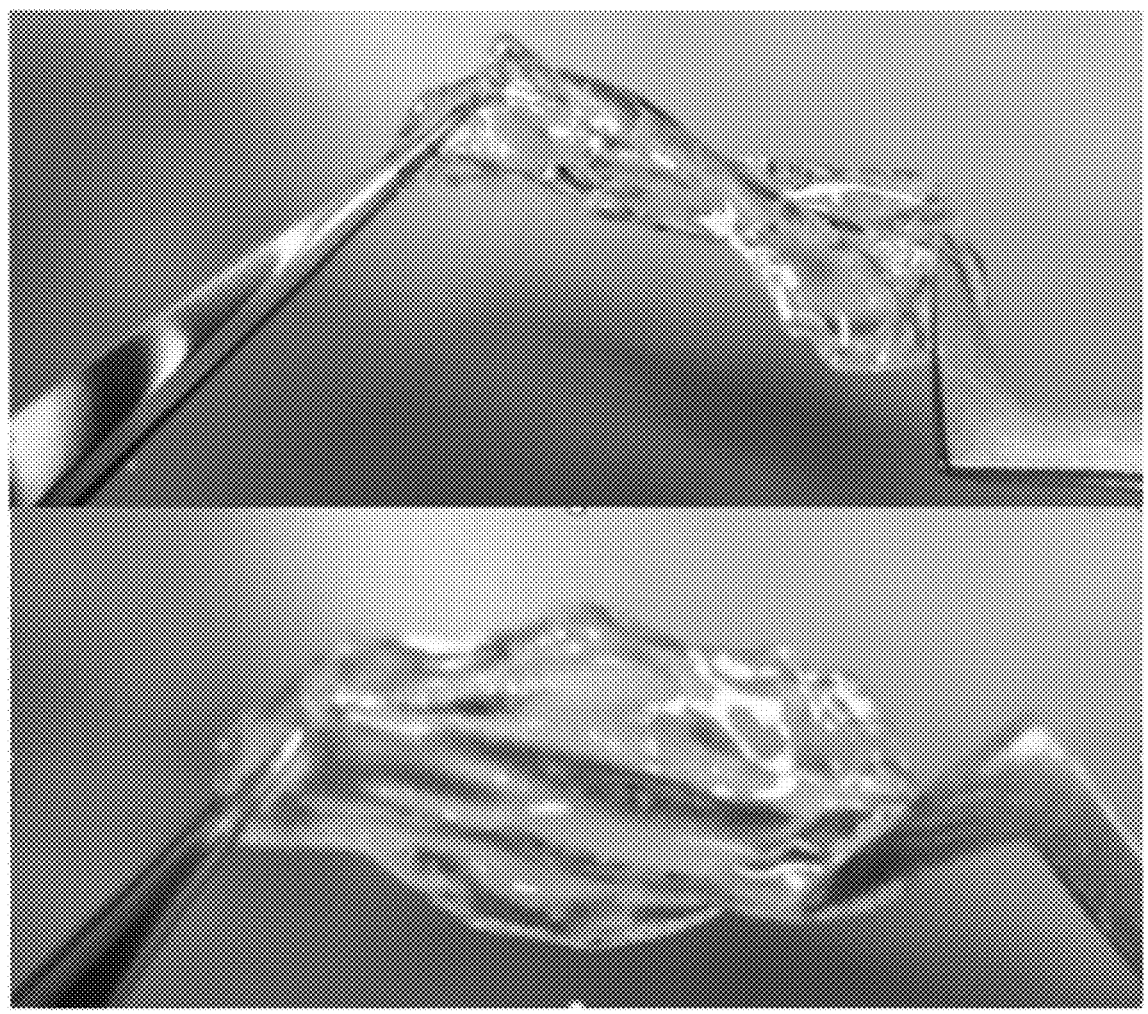
FIG. 2 shows digital images of molybdenum-doped PVPA, redox-mediated electrolyte PVPA/MoX hydrogels.

FIG. 2 shows digital photographs of the exemplary PVPA/MoX hydrogels. By changing the concentration of the Mo ions in the matrix, no color change was noticed for PVPA based electrolyte.

Figure 3:
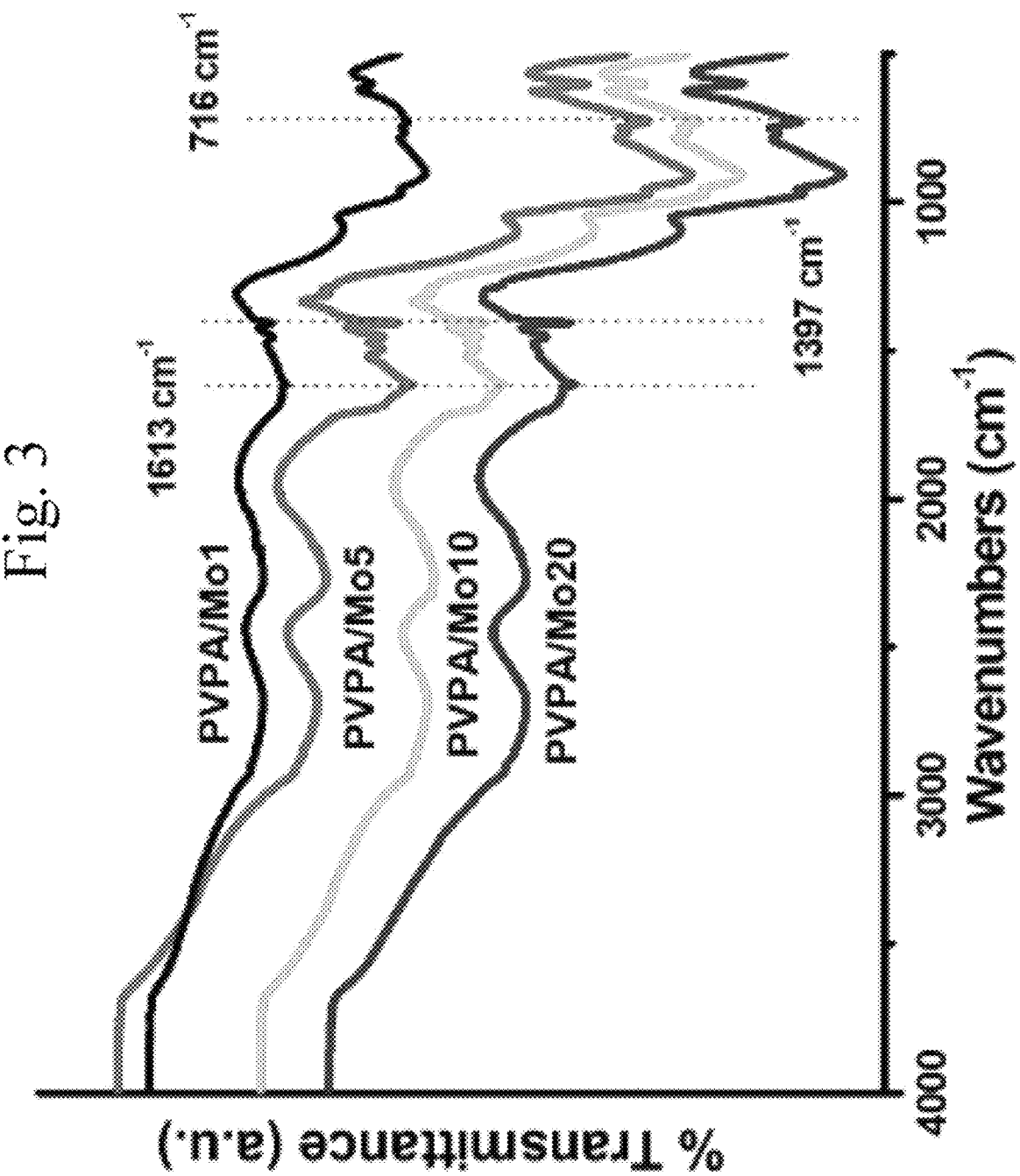
FIG. 3 shows Fourier-transform infrared (FT-IR) spectra of exemplary inventive PVPA/MoX materials with varied weight percent Mo-doping.

FIG. 3 shows the Fourier-transform infrared (FT-IR) spectrum of exemplary inventive PVPA/MoX based electrolyte systems. The FT-IR spectrum of ammonium molybdate comprises several strong absorption peaks at 900, 815, 622, and 550 cm$^{-1}$, belonging to stretching and bending vibrations of Mo—O and Mo—O—Mo. The characteristic broad peak between 990-910 cm$^{-1}$ can be attributed to (P—O)—H stretching, and the peak at 1150 cm$^{-1}$ belongs to P—O of phosphoric acid groups of the PVPA. The phosphonic acid group gives additional broad band in the region of 1635 cm$^{-1}$. The broadening between 3300 and 2000 cm$^{-1}$ can be attributed to hydrogen boding network formation among phosphonic acid groups. The introduction of Mo results in a new peak at 716 cm$^{-1}$ due to Mo—O—Mo stretching and this peak became more pronounced at higher doping ratios.

Figure 4:
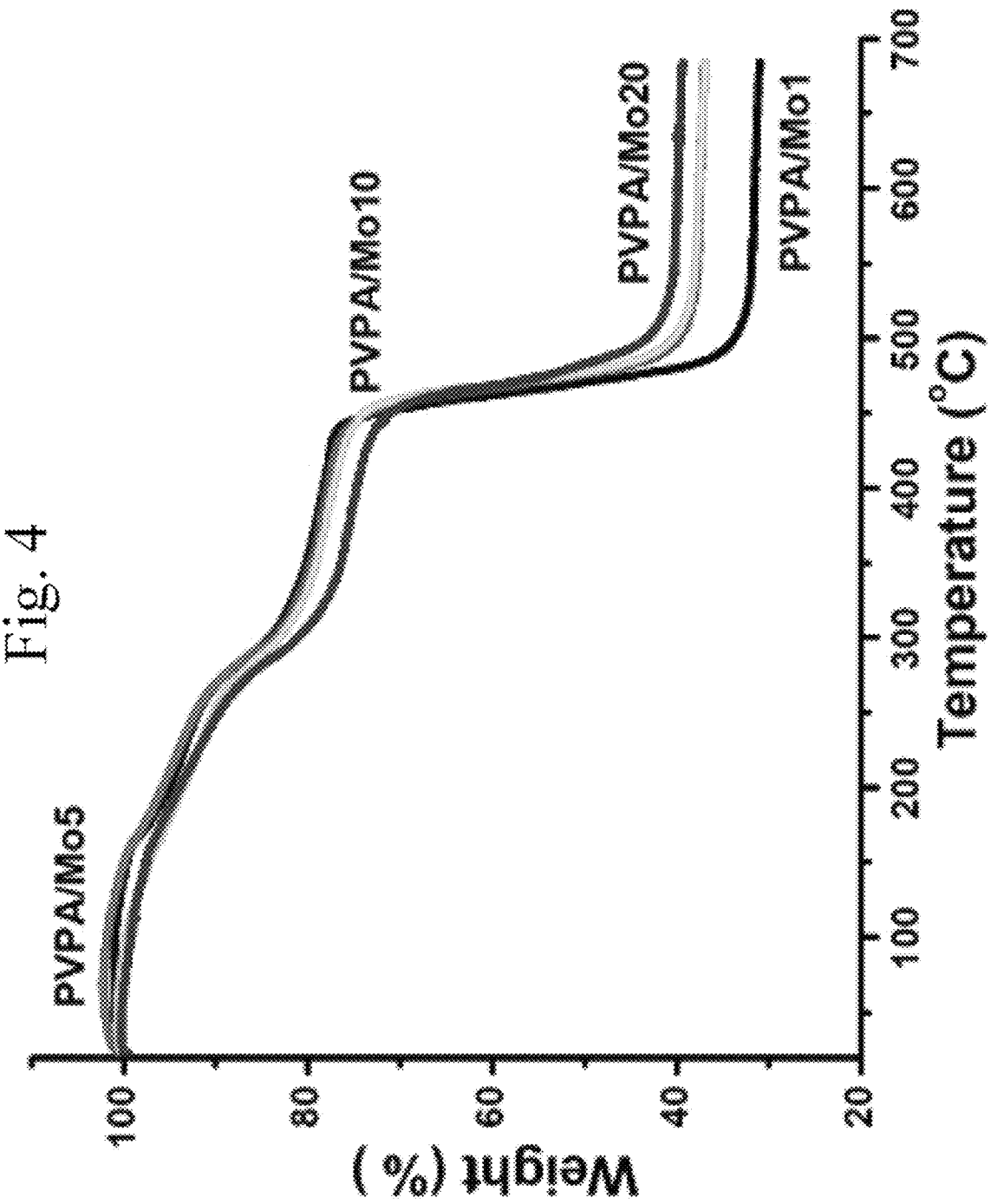
FIG. 4 shows thermogravimetric analysis (TGA) thermograms of dry exemplary inventive PVPA/MoX electrolytes with varied weight percent Mo-doping.

FIG. 4 shows a thermogravimetric analysis (TGA) curve of exemplary inventive PVPA/MoX electrolytes, demonstrating weight changes in roughly three steps or stages. The first stage starts at roughly 155° C. and ends at roughly 262° C., constituting a 10% weight loss that can be attributed to condensation of phosphonic acid groups. The second stage begins above 270° C. and may be due to the loss of ammonia and further condensation of acidic units. The third stage may correspond to the degradation of the redox mediated electrolytes, i.e., PVPA/Mo1, PVPA/Mo5, PVPA/Mo10, and PVPA/Mo20, respectively starting at 437, 439, 439, and 442° C. The increase in the Mo fraction results in improved thermal stability of the PVPA/MoX electrolytes.

Figure 5:
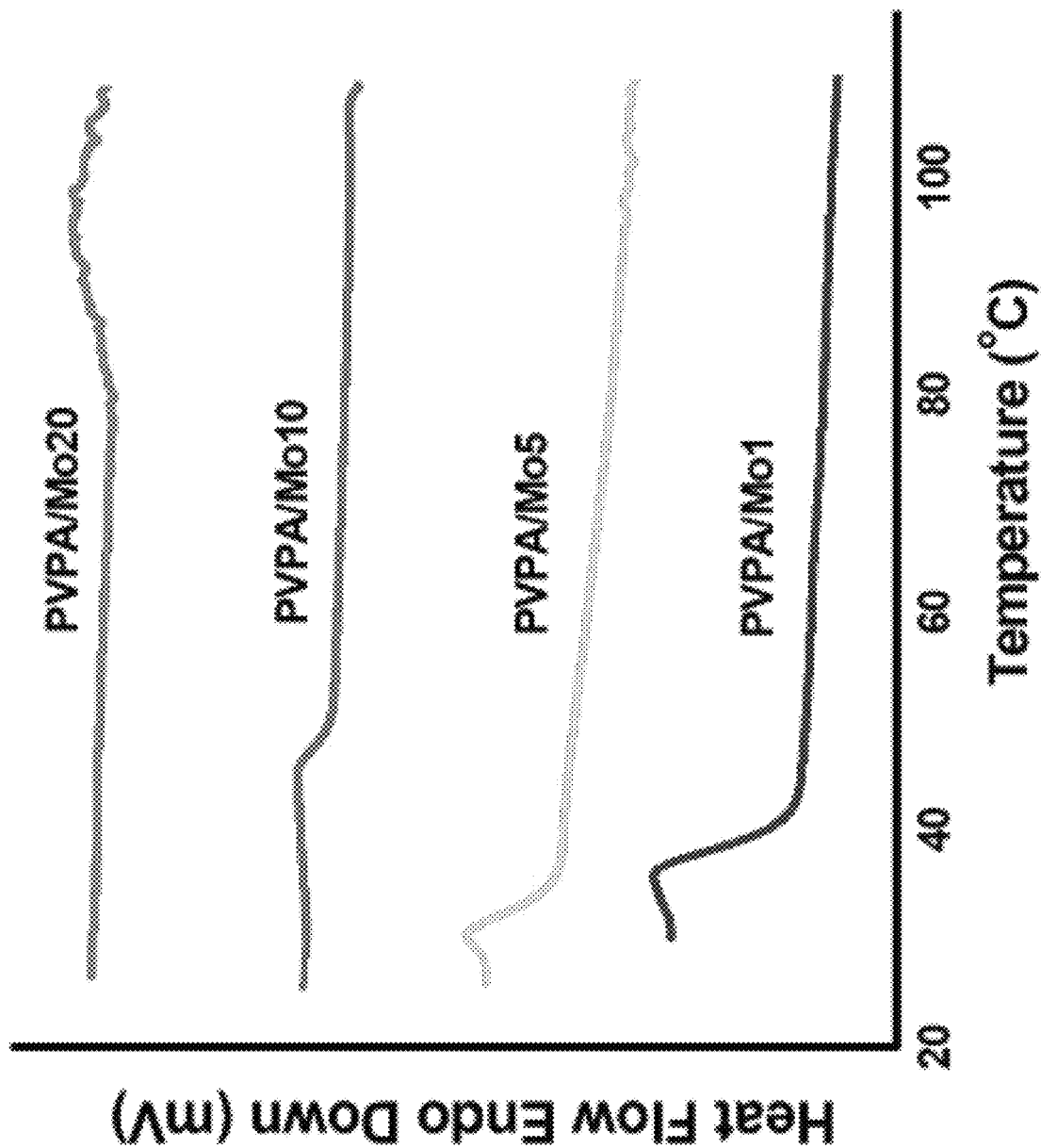
FIG. 5 shows differential scanning calorimetry (DSC) plots of an exemplary inventive Mo-doped PVPA electrolytes with varied weight percent Mo-doping.

FIG. 5 shows differential scanning calorimetry (DSC) plots to study the glass transition temperatures ($T_g$) of the dried inventive PVPA/MoX electrolytes. The $T_g$ of the PVPA/Mo1 sample was measured to be 38.5° C., and the $T_g$ of the PVPA/Mo3 sample was measured to be 32.6° C. As evidenced by the second plot from the top, increasing the content of Mo from 5 to 10 wt. % shifts the $T_g$ to 47° C. for the PVPA/Mo10 sample, while no Tg was observed for the PVPA/Mo20 sample. The behavior of the PVPA/Mo20 sample may be described by the complexation of the redox additive by the polymer, thereby reducing the cooperative segmental motions of the polymer chains.

Figure 6:
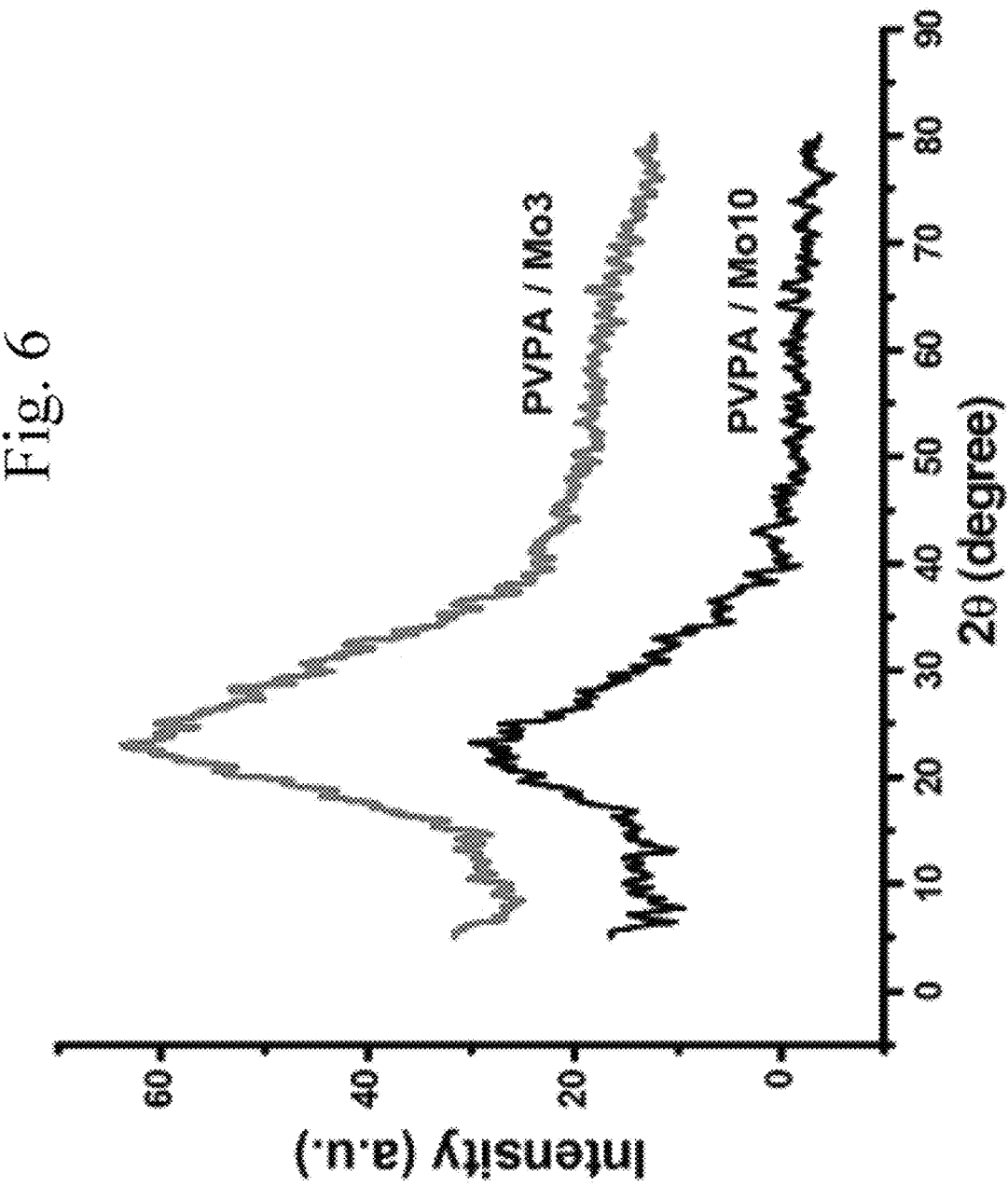
FIG. 6 shows x-ray diffraction (XRD) patterns of exemplary inventive PVPA/Mo3 and PVPA/Mo10 materials.

FIG. 6 shows the x-ray diffraction (XRD) patterns of dried inventive PVPA/MoX samples. The patterns illustrate typical amorphous nature in both PVPA/Mo3 and PVPA/Mo10 electrolytes. Further broadening and shifting of the peak from 23.2 to 22.6° (2θ) occurred with increased Mo content. This broadening behavior may indicate complexation between Mo and PVPA to increase the amorphous character of the final material.

Figure 7:
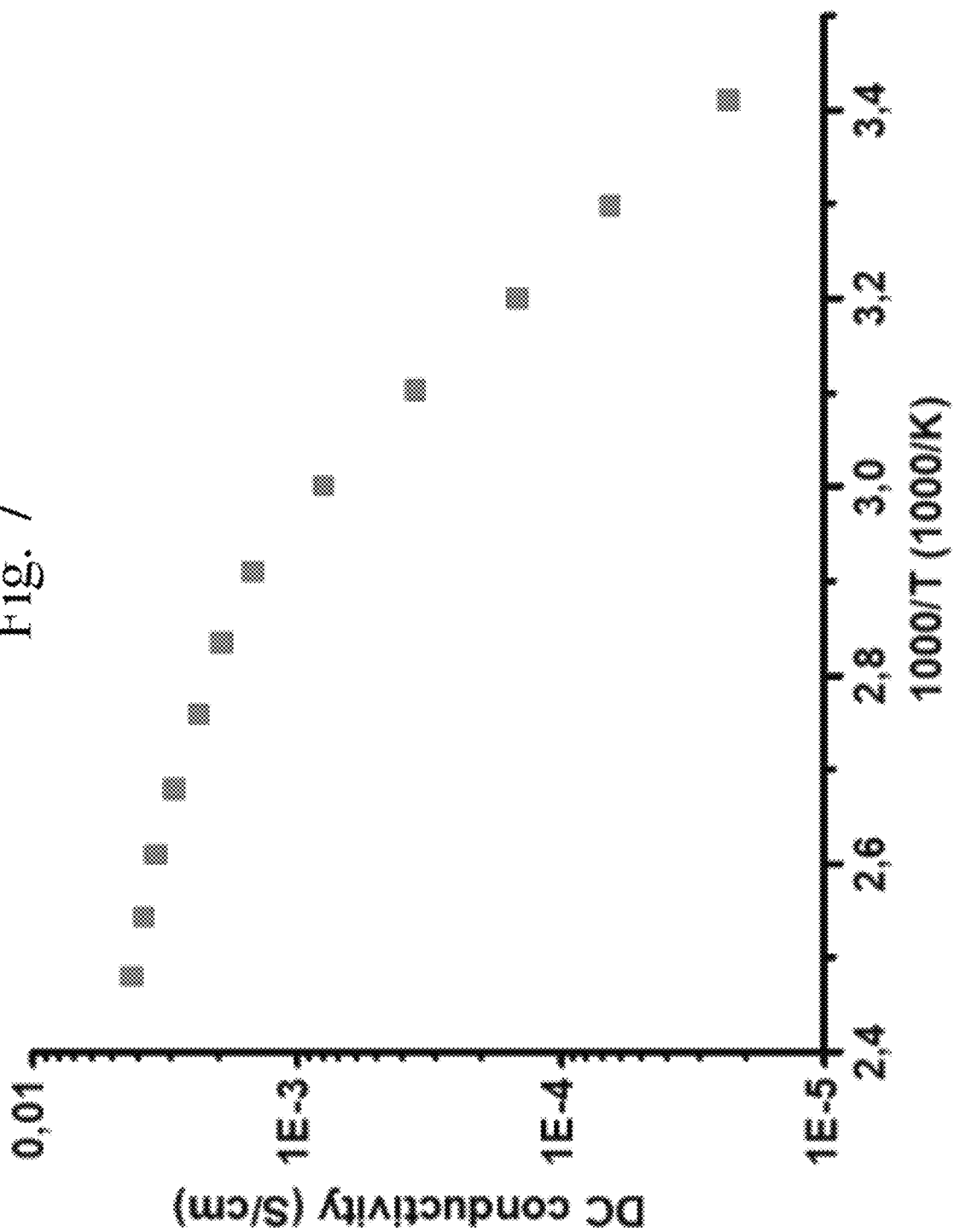
FIG. 7 shows direct current (DC) conductvity of pure PVPA.

FIG. 7 shows the direct current (DC) conductivity of the PVPA derived from alternating current (AC) conductivity. The ion conductivity of the pure polymer electrolyte depends on the temperature, and ranges from 2.3×10$^{-5}$ to 4.1×10$^{-3}$ S/cm.

Figure 8:
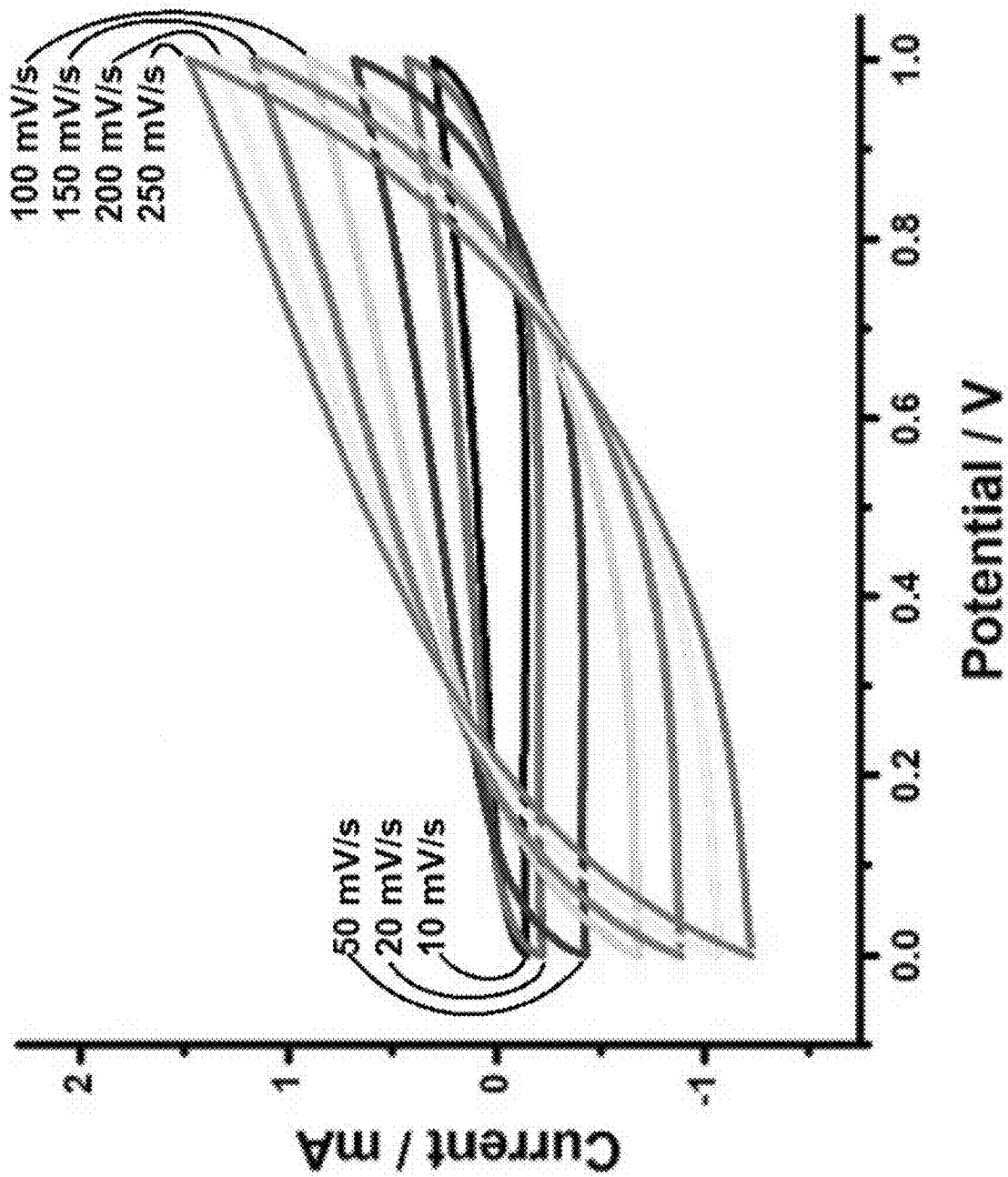
FIG. 8 shows cyclic voltammetry of pure PVPA-based supercapacitor measured at different scan rates.

FIG. 8 shows cyclic voltammetry traces performed in the presence of neat polyelectrolyte (PVPA) at different at scan rates from 10 to 250 mV/s within potential window of 0 to 1 V. The voltammogram of a symmetrical device with a configuration electrode/PVPA/electrode shows a quasi-rectangular shape, indicating the formation of an electric-electrochemical double-layer capacitor (EDLC). The rate of current density increases with increasing scan rate, indicating fast ion transfer capability of the PVPA polyelectrolyte. The acidic groups in the polyelectrolyte may provide the ion dissociation and diffusion between the carbon electrodes on current collectors.

Figure 9:
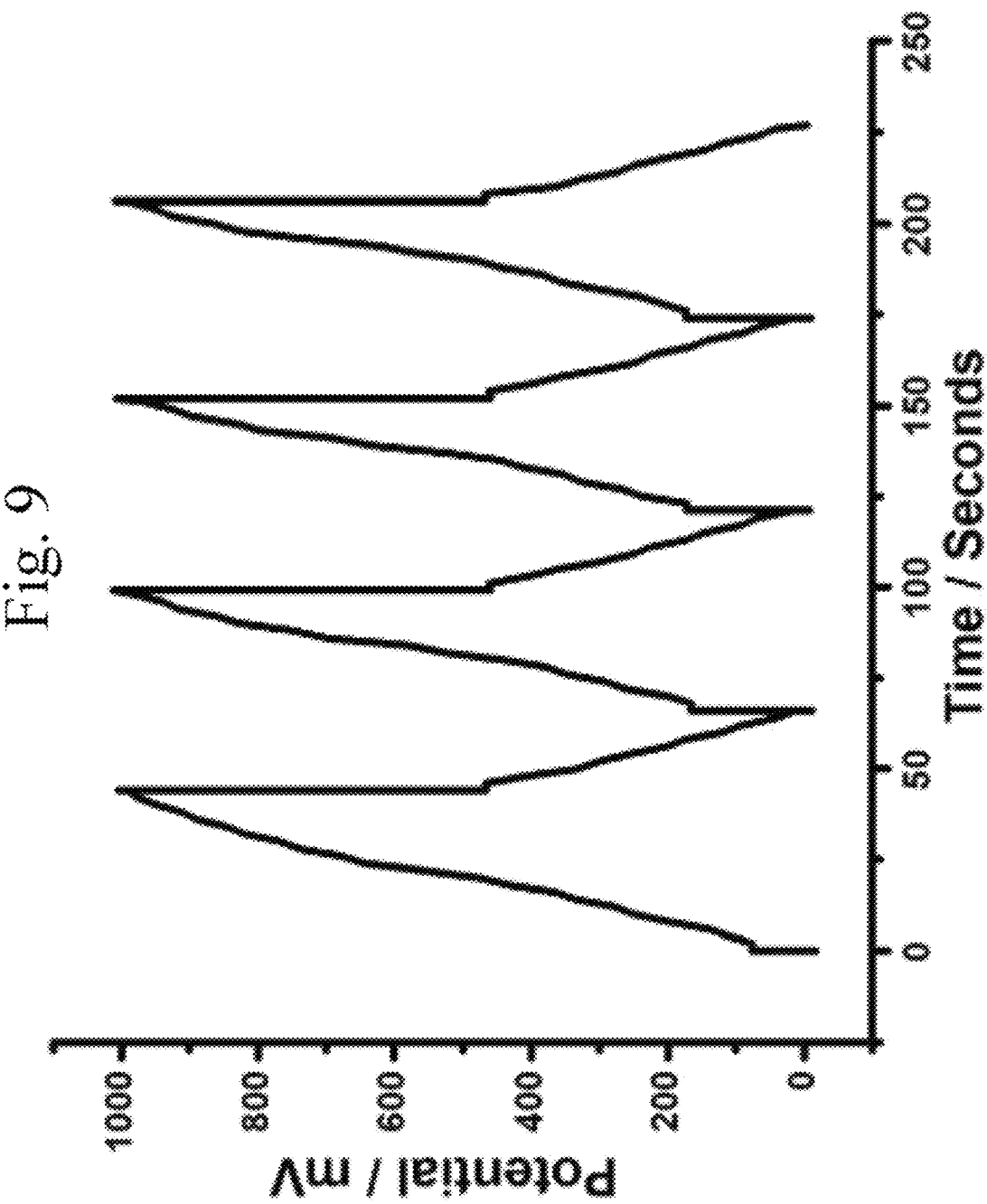
FIG. 9 shows charge-discharge curves of an exemplary inventive PVPA-based supercapacitor at a current density of 1 mA.

FIG. 9 shows typical galvanostatic charge-discharge (GCD) curves of a supercapacitor including as a hydrogel. The supercapacitor was tested by scanning a charging voltage to 1 V and discharging voltage to 0 V with a current density of 1 mA. The GCD curves indicate that the system has fast voltage drops during the discharge time. Such fast voltage drops demonstrate that high capacitance values cannot be achieved as such in electrochemical supercapacitors using pure PVPA polyelectrolyte.

Figure 10:
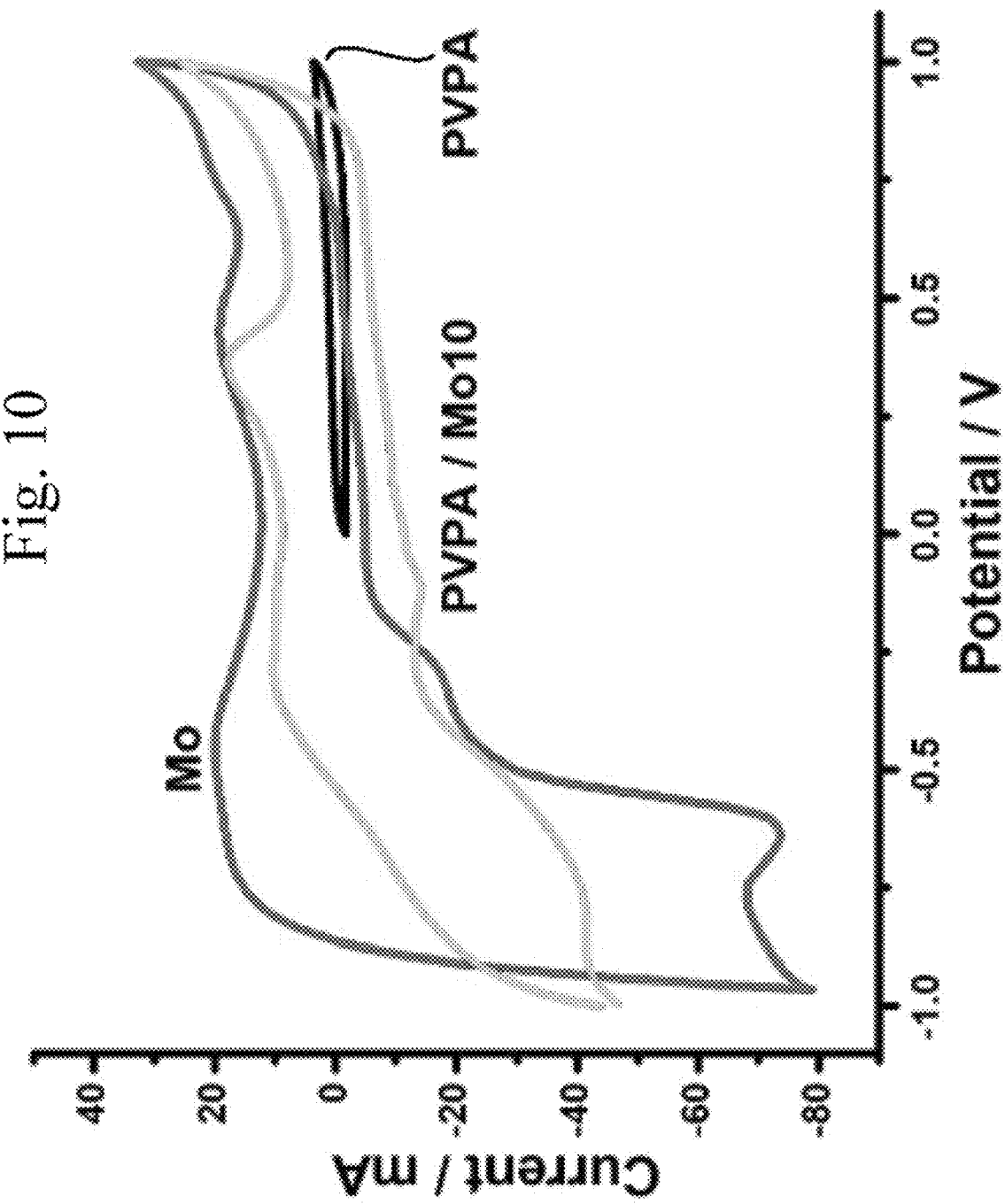
FIG. 10 shows comparative cyclic voltammetry (CV) curves of pure PVPA, pure ammonium molybdate (Mo), and an exemplary PVPA/Mo10 material-based supercapacitors.

FIG. 10 shows cyclic voltammetry (CV) measurements of exemplary inventive PVPA hydrogels comprising Mo performed in a solution containing 0.1 M KCl and 0.01 M HCl. The voltammogram of a pure PVPA-based supercapacitor with activated carbon (AC) electrodes at a scan rate of 100 mV/s is illustrated in the center right of the chart. Due to the stable structure of the PVPA hydrogel, no oxidation-reduction peak was observed within the scanned potential range for pure PVPA. The CV curve of the pure Mo shown at a potential window of −1 V to +1 V and a scan rate of 100 mV/s is the largest trace. The Mo trace shows two strong redox peaks of Mo on the potential window under the same condition, in the range of −0.1 V/0.4 V for oxidation-reduction ion transitions of Mo (VI)/Mo (IV) and in the range of 0.5 V/0.1 V for oxidation-reduction ion transitions of Mo (VI)/Mo (V). These redox balances are represented by Equations 4 and 5, below.

$$H_2Mo(IV)O_3 + H_2O \rightarrow H_2Mo(VI)O_4 + 2e^- + 2H^+ \qquad \text{Eq. 4}$$

$$HMo(V)O_3 + H_2O \rightarrow H_2Mo(VI)O_4 + e^- + H^+ \qquad \text{Eq. 5}$$

$MoO_4$ species have been reported to tend to pass to the polymeric ion structure ($H_2MoO_4$) at oxidation level of +VI in acidic medium. Possibly due to the acidic nature of the PVPA hydrogel, the transformation of molybdate into $H_2MoO_4$ was noticeable in the CV diagram.

As seen in FIG. 10, the ion transfer throughout the polymeric hydrogel increased by increasing the scan rate from 20 to 250 mV/s. The intensity of reversible redox peaks are also increased by increasing the scan rate from 20 to 250 mV/s, which indicates charge transfer capability within the exemplary inventive PVPA/Mo hydrogels. In addition, the CV peaks of the Mo-containing hydrogel maintained its behavior at low and high scanning rates, demonstrating electrochemical stability as well as excellent charging performance of the inventive PVPA/Mo hydrogel.

Figure 11:
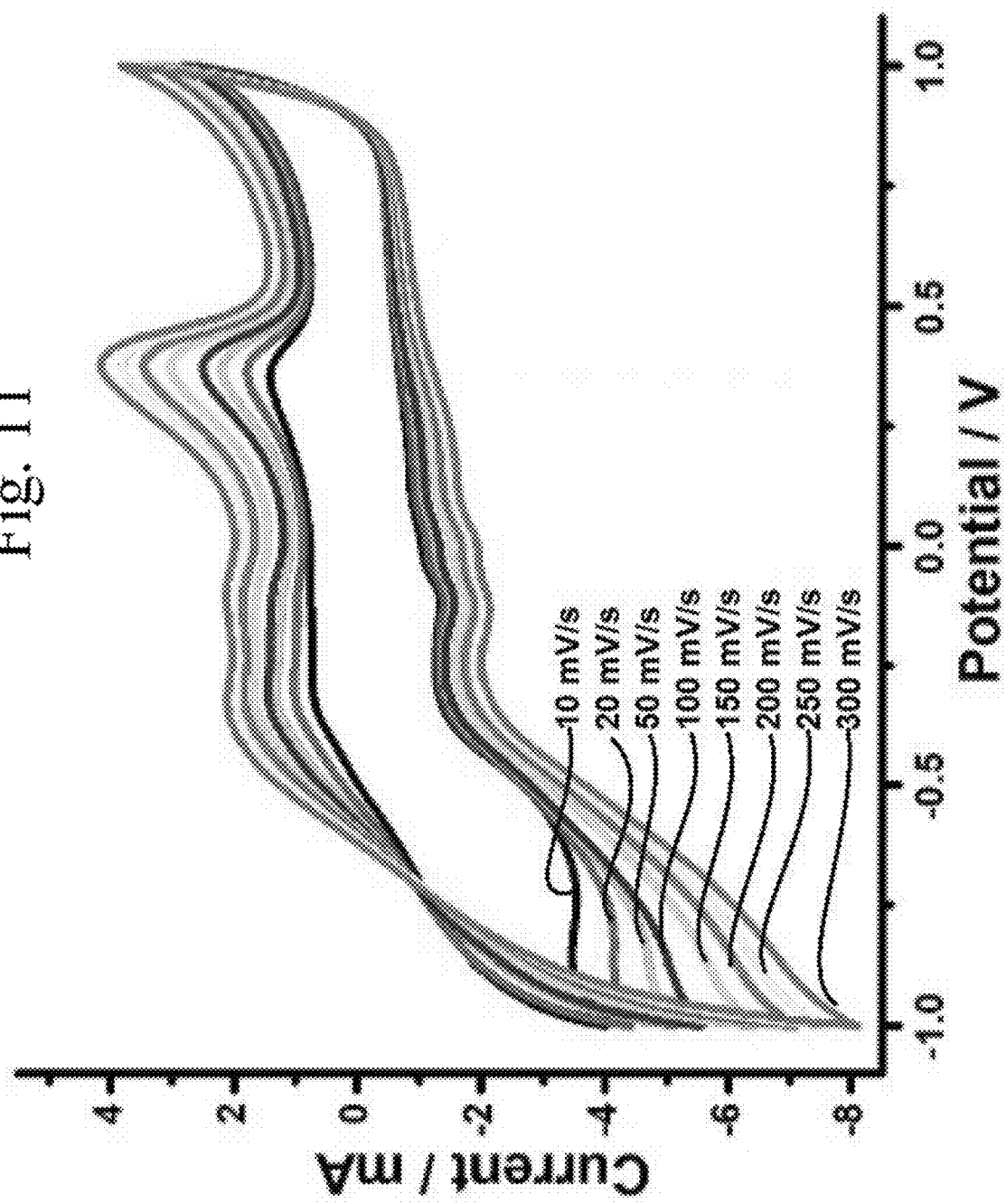
FIG. 11 shows cyclic voltammetry curves of an exemplary inventive supercapacitor including PVPA/Mo10 at different scan rates.
Figure 12:
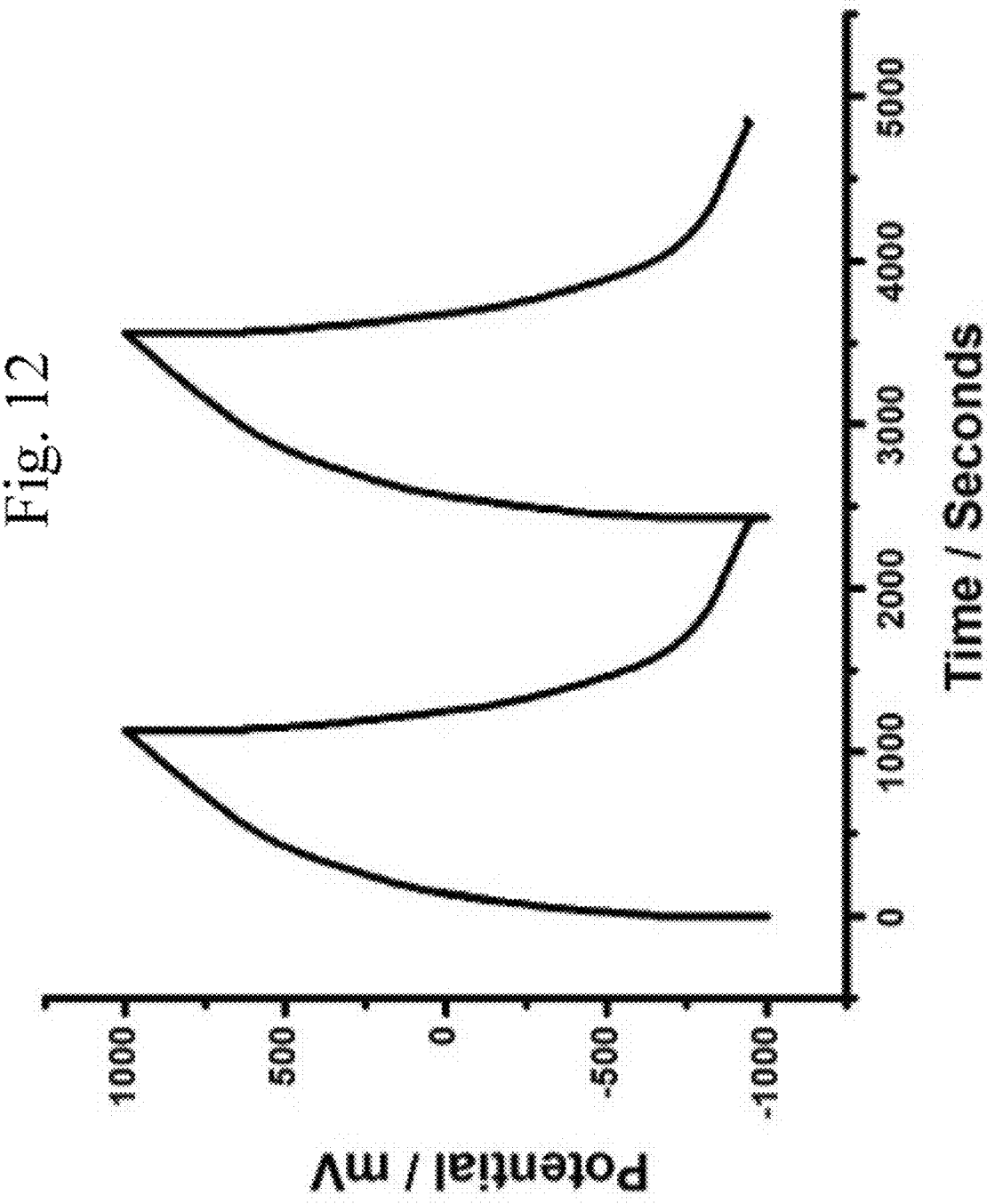
FIG. 12 shows galvanostatic charge-discharge (GCD) curves of an exemplary inventive PVPA/Mo$_{10}$ supercapacitor obtained at 1 mA current density.

FIG. 11 shows the galvanostatic charge-discharge (GCD) curves of the exemplary inventive Mo-doped PVPA hydrogels, carried out as the system charging to 1 V and discharging to −1 V with a current density of 1 mA. Excellent performance enhancement was observed after insertion of Mo into the hydrogels. The GCD curves of the exemplary PVPA/Mo hydrogels showed ideal electrochemical supercapacitor behavior with extended charging and discharging time, particularly relative to the PVPA-based supercapacitor. These results indicate that capacitance values can be increased, e.g., at least 40, 42.5, 45, 47.5, 50, 52.5, 55, 57.5, 60, 65, 75, 85-fold or more, by doping hydrogels with Mo and/or similar redox metals, indicating outstanding charge storing capability.

Figure 13A:
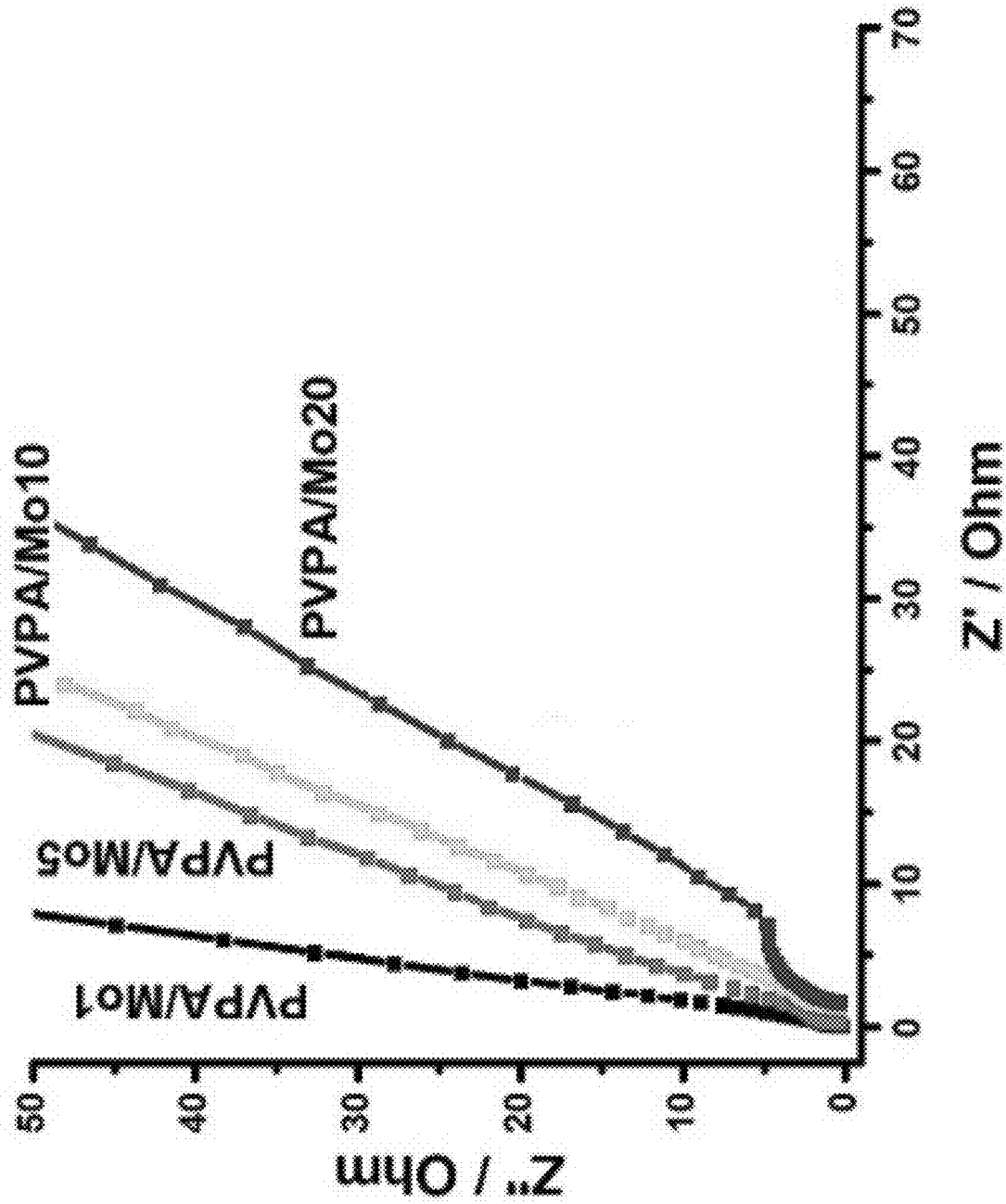
FIG. 13A shows electrochemical impedance spectroscopy (EIS) plots of exemplary inventive PVPA/MoX hydrogels (X: 1, 5, 10, 20)
Figure 13B:
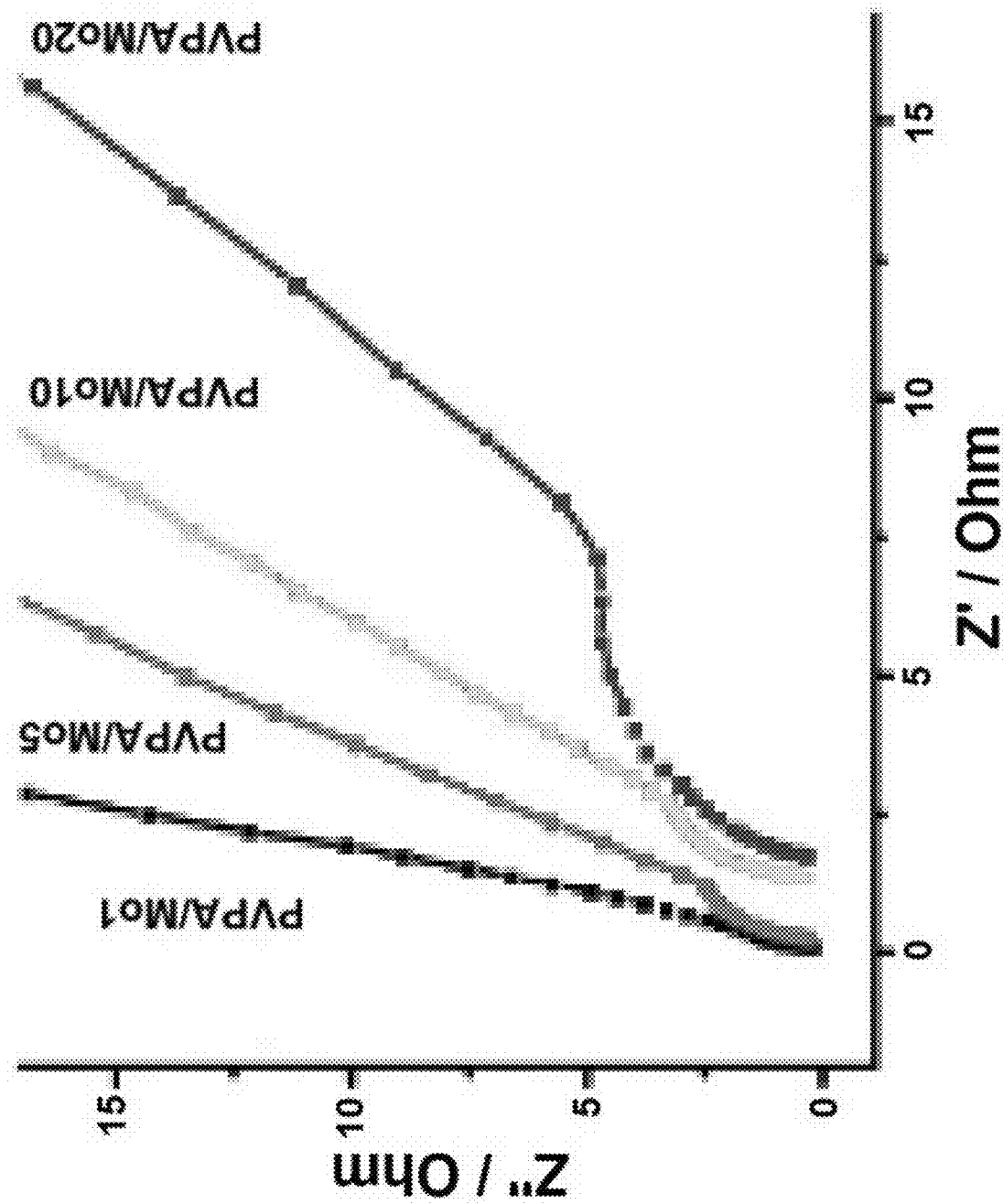
FIG. 13B shows the EIS plots of FIG. 13, expanded toward the origin.
Figure 15A:
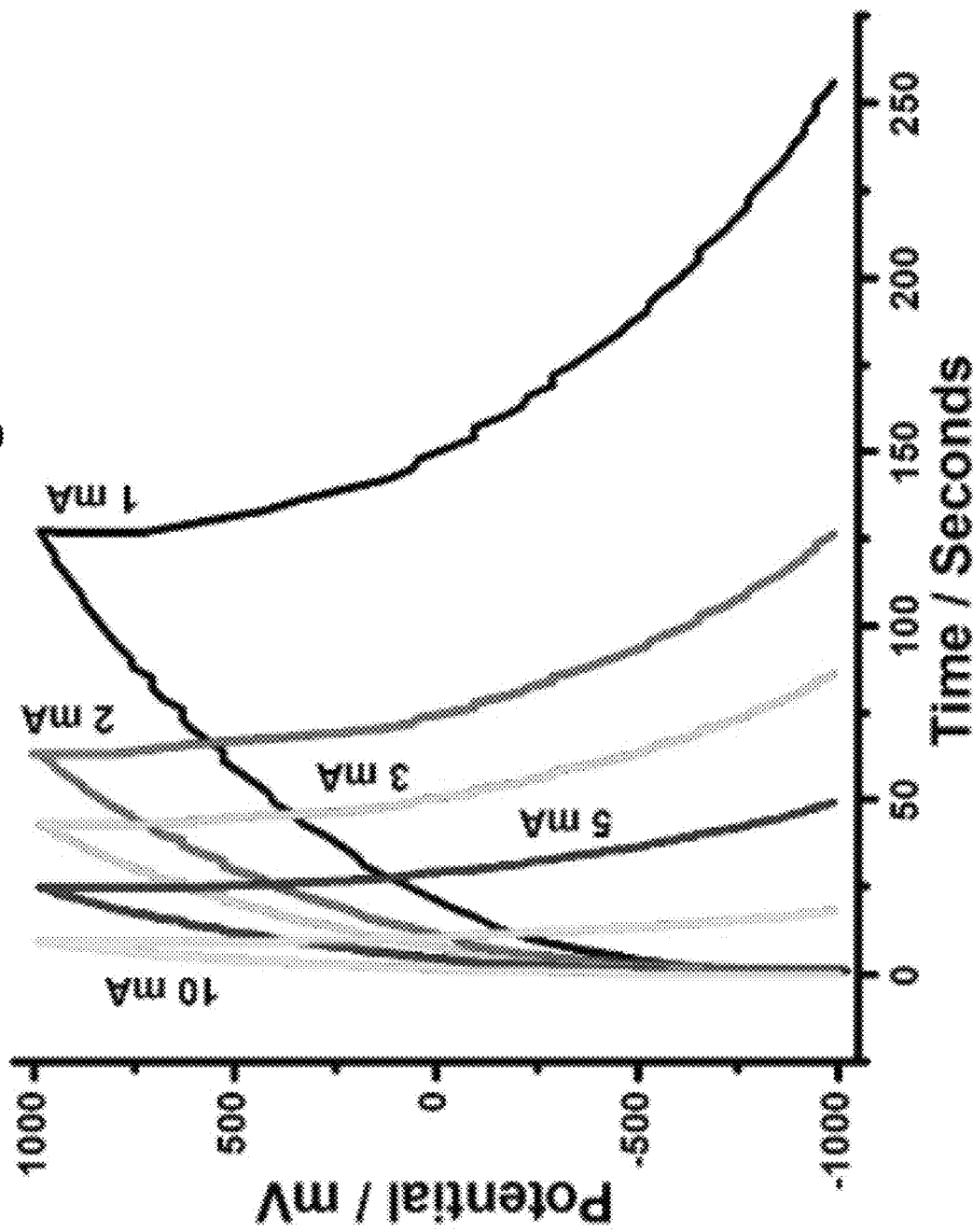
FIG. 15A shows galvanostatic charge-discharge (GCD) curves of an exemplary PVPA/Mo1 material under varied current.
Figure 15B:
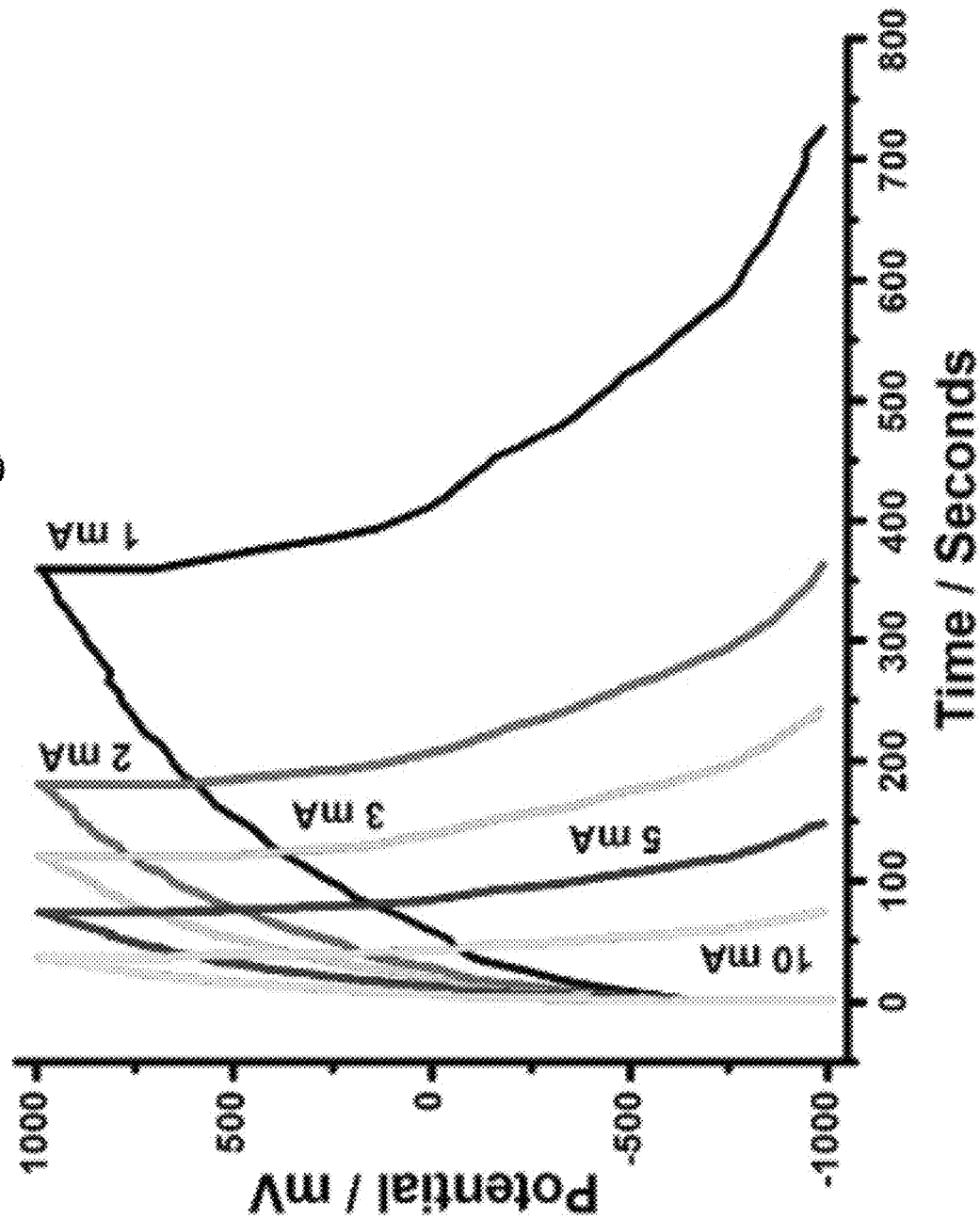
FIG. 15B shows galvanostatic charge-discharge (GCD) curves of an exemplary PVPA/Mo5 material under varied current.
Figure 15D:
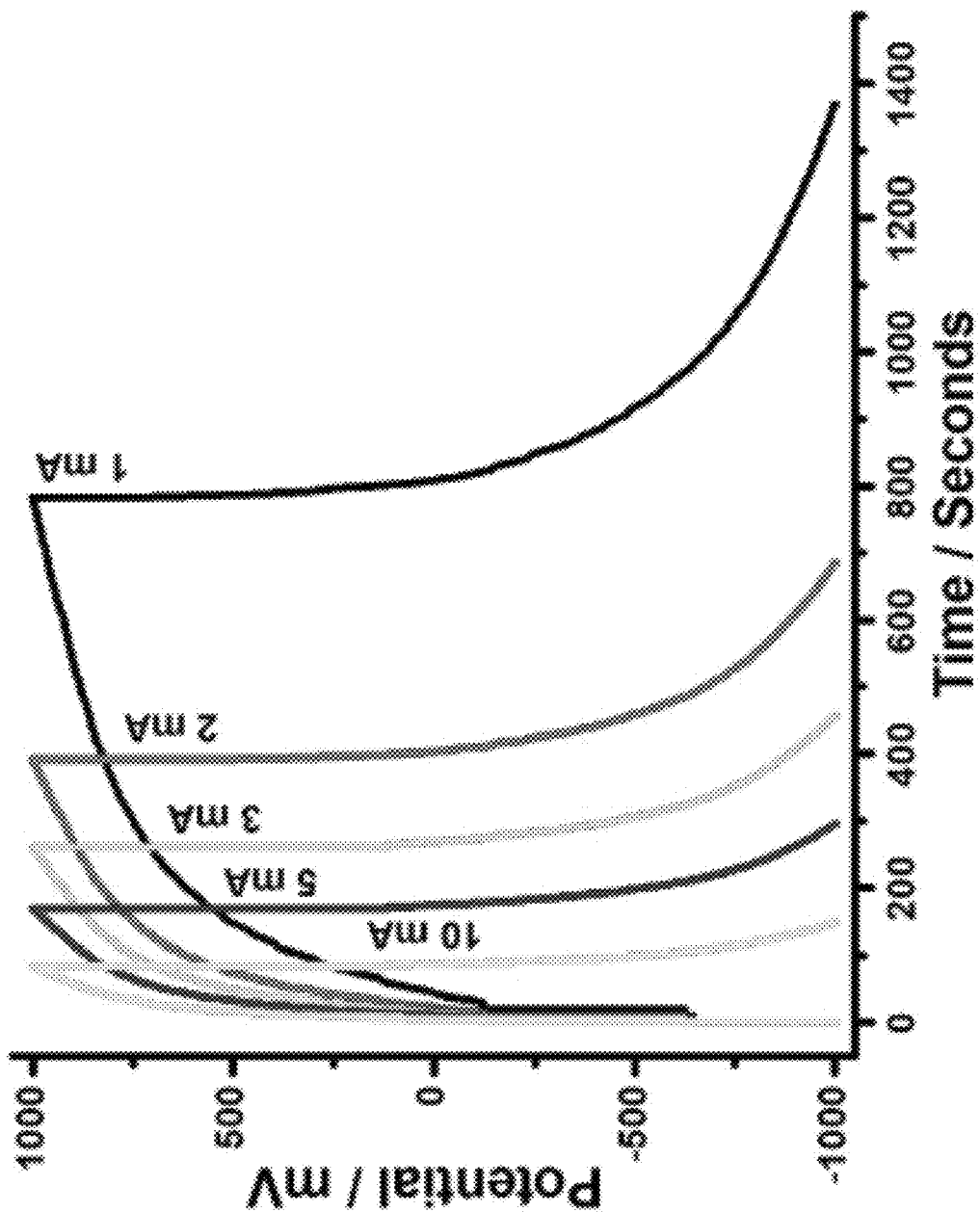
FIG. 15D shows galvanostatic charge-discharge (GCD) curves of an exemplary PVPA/Mo20 material under varied current.

FIGS. 13A and 13B show Nyquist plots for different concentrations of Mo-doped PVPA-based supercapacitors, i.e., PVPA/MoX devices. The inventive device electrodes were found to have resistances of 0.33 ohm for PVPA/Mo1, 0.55 ohm for PVPA/Mo5, 0.92 ohm for PVPA/Mo10, and 2.21 ohm for PVPA/Mo20. The intersection of the Nyquist plots at the x-axis equals the equivalent series resistance (ESR). The Warburg resistance (W) of the exemplary inventive systems at low frequency area indicates the diffusion of ions through the pores in the surface of the electrodes. The Warburg impedance of all inventive supercapacitor samples indicated that the activated carbon and PVPA/Mo system allow ion diffusion on the electrode surface, which can increase the charge-discharge performance of the system. The charge transfer resistance (Ret) values of the symmetrical supercapacitors obtained from the diameter of the semicircle at high frequency region were 2.27 ohm for PVPA/Mo1, 3.85 ohm for PVPA/Mo5, 5.57 ohm for PVPA/Mo10, and 9.85 ohm for PVPA/Mo20.

FIG. 14 shows comparative galvanostatic charge-discharge (GCD) curves obtained from supercapacitors including PVPA and PVPA/Mo10 hydrogels. The GCD traces of symmetrical PVPA based supercapacitors were performed by applying the potential from 0 V to 1 V at current density of 1 mA. After addition of redox active Mo into the PVPA, the voltage window was extended within the electroactive region of the Mo. The GCD measurements were carried out between −1 V to 1 V, based on the redox peaks observed in the cyclic voltammograms. Supercapacitor containing Mo-doped electrolyte revealed more than 50 times higher discharge time compared to the pure PVPA in FIG. 14. The electrochemical oxidation-reduction reactions of Mo ions are observed to increase the charge storage performance of the supercapacitor.

FIG. 15A to 15D show charge-discharge measurements of the exemplary inventive supercapacitors comprising PVPA/Mo hydrogels at different current densities. The galvanostatic charge-discharge (GCD) curves of different supercapacitors comprising PVPA/MoX (X=1, 5, 10, and 20) electrolytes at current densities of 1 mA to 10 mA. Supercapacitors containing Mo show pseud-ocapacitive GCD trends and different and higher capacitance values compared to systems with only PVPA. Such behavior was supported by cyclic voltammograms and can be attributed to the redox behavior of Mo ions on the electrode surface. The increase in the current density can be seen to diminish the charge and discharge times of the device, demonstrating higher charge transfer over time. The plots show that all the discharge curves have a rapid voltage loss, and this drop is further increased at higher current densities, i.e., above 4, 4.5, 5, 6, or 7.5 mA. Despite the rapid voltage loss, a limited reduction in capacitance values occurred. This may be explained by a high ion transfer capability of inventive PVPA/MoX hydrogels allowing the charge storage at any potential level.

Figure 16:
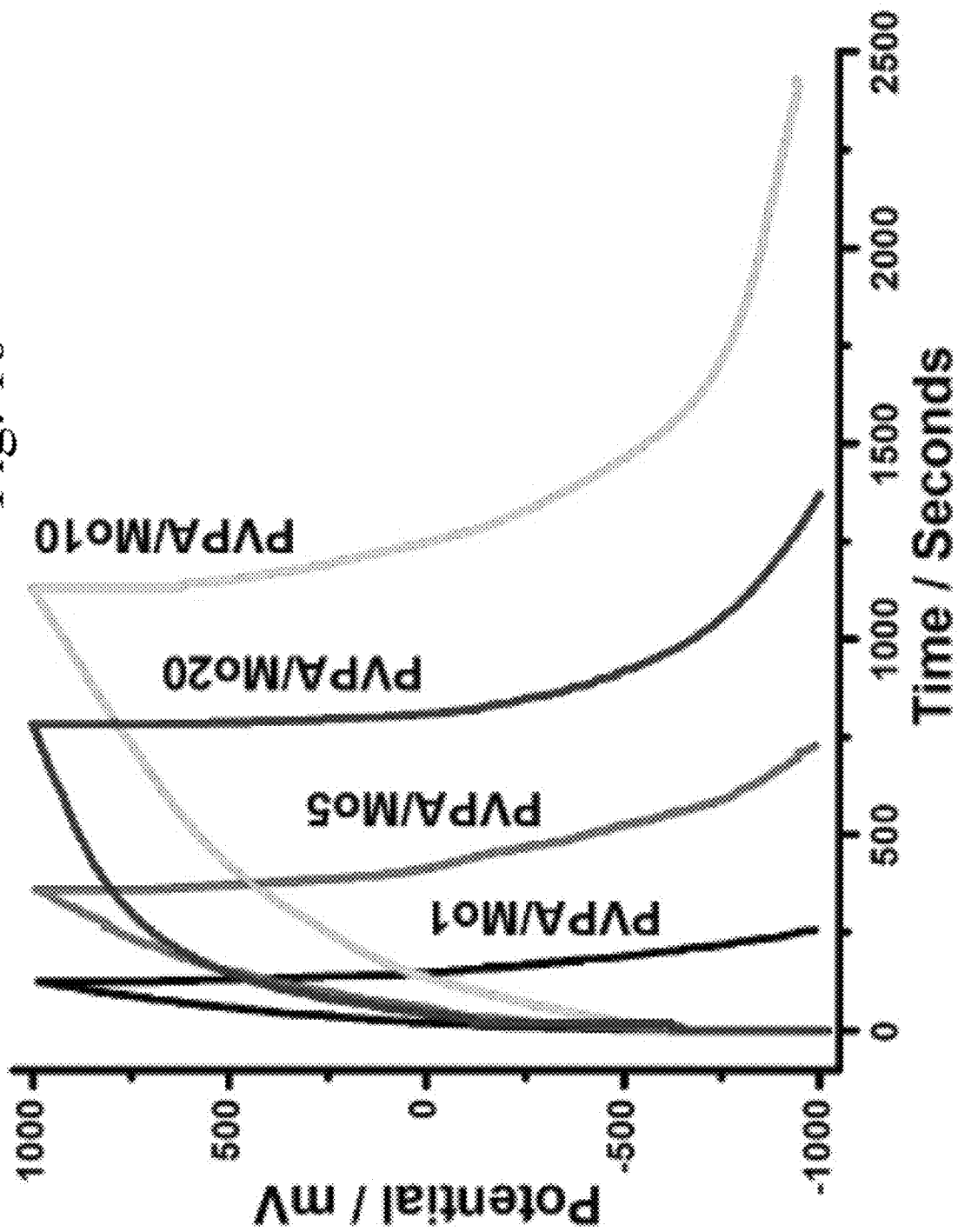
FIG. 16 shows galvanostatic charge-discharge (GCD) curves comparing exemplary PVPA/Mo1, PVPA/Mo5, PVPA/Mo10, and PVPA/Mo20 hydrogels at 1 mA current density.

FIG. 16 shows the comparison of galvanostatic charge-discharge (GCD) curves of PVPA hydrogel-based supercapacitors with different Mo doping fractions at a current density of 1 mA. The exemplary inventive PVPA/Mo10-based supercapacitor provides the highest capacitance, as well as the maximum discharge time, under identical conditions.

Figure 17:
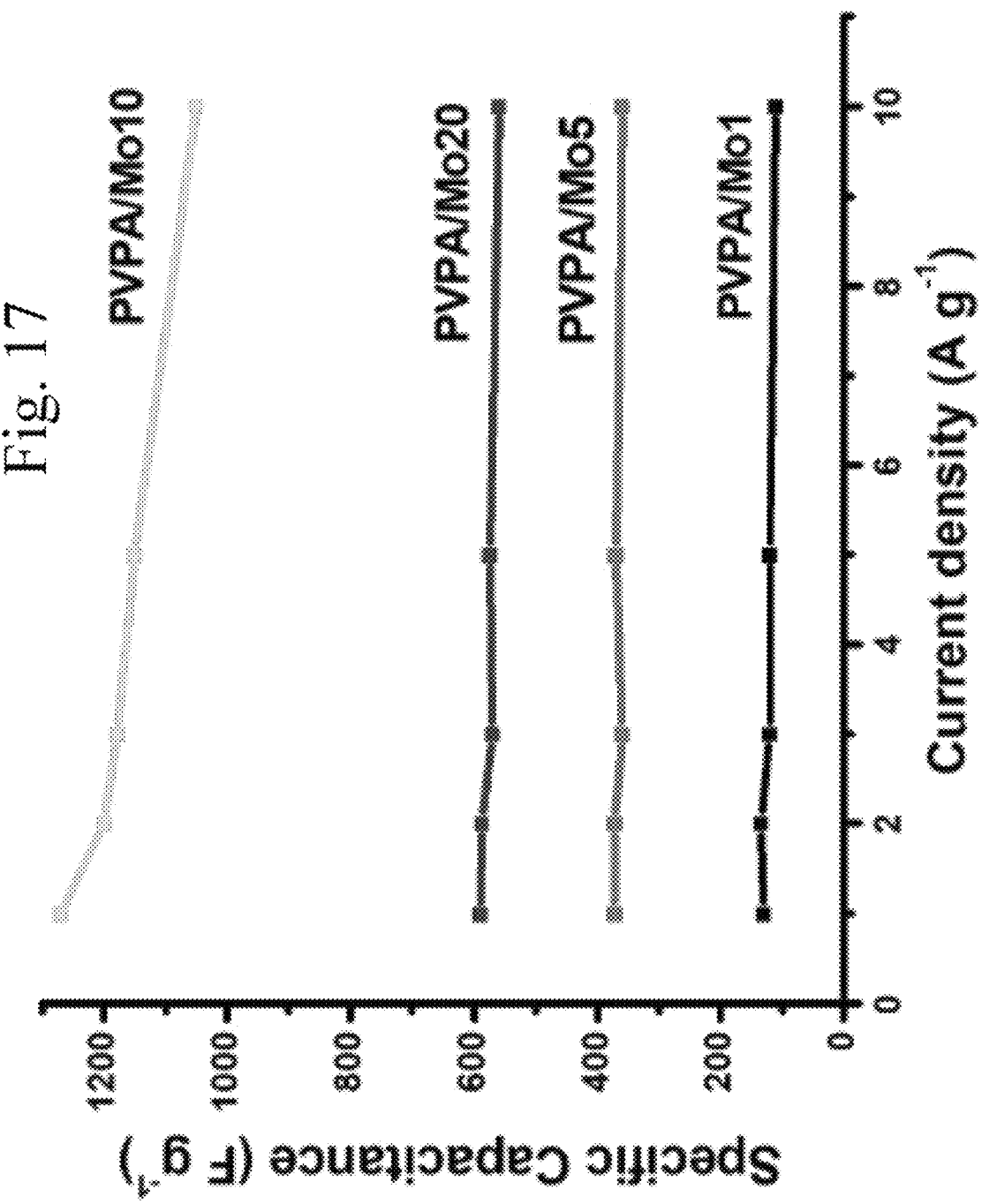
FIG. 17 shows specific capacitance variations of devices with selected inventive PVPA/MoX samples with respect to current density.

FIG. 17 shows the specific capacitances ($C_s$) of pure PVPA and exemplary inventive PVPA/MoX-based symmetrical supercapacitors, obtained at potentials ranging from 0.0 to 1 V and −1 to 1 V and varied current densities, i.e., 1, 2, 3, 5 and 10 mA. The supercapacitor comprising PVPA shows a $C_s$ of 50 F/g at a current density of 1 A/g. An improvement was achieved after insertion of Mo into the hydrogel and it increased up to 1276 F/g in the sample containing PVPA/Mo10 hydrogel. The $C_s$ of the supercapacitor with PVPA/MoX increased with x up to 10%, reaching the highest performance tested for PVPA/Mo10. Increasing the concentration of Mo ions from 10 to 20 wt. % resulted in a decrease in the $C_s$ at the same current density. The highest $C_s$ values were observed at a low current density, which may be due to the motion of ions between electrodes having the maximum possible ion diffusion to be stored by all layers of the active material. At high current density, the effective use of the electrode active material is limited only to the outer surface of the active material, which can reduce the specific capacitance value. Following this theory, redox active Mo ions can reach all layers of active electrode material and increase the charge storage capability by their redox active functionality.

Figure 18:
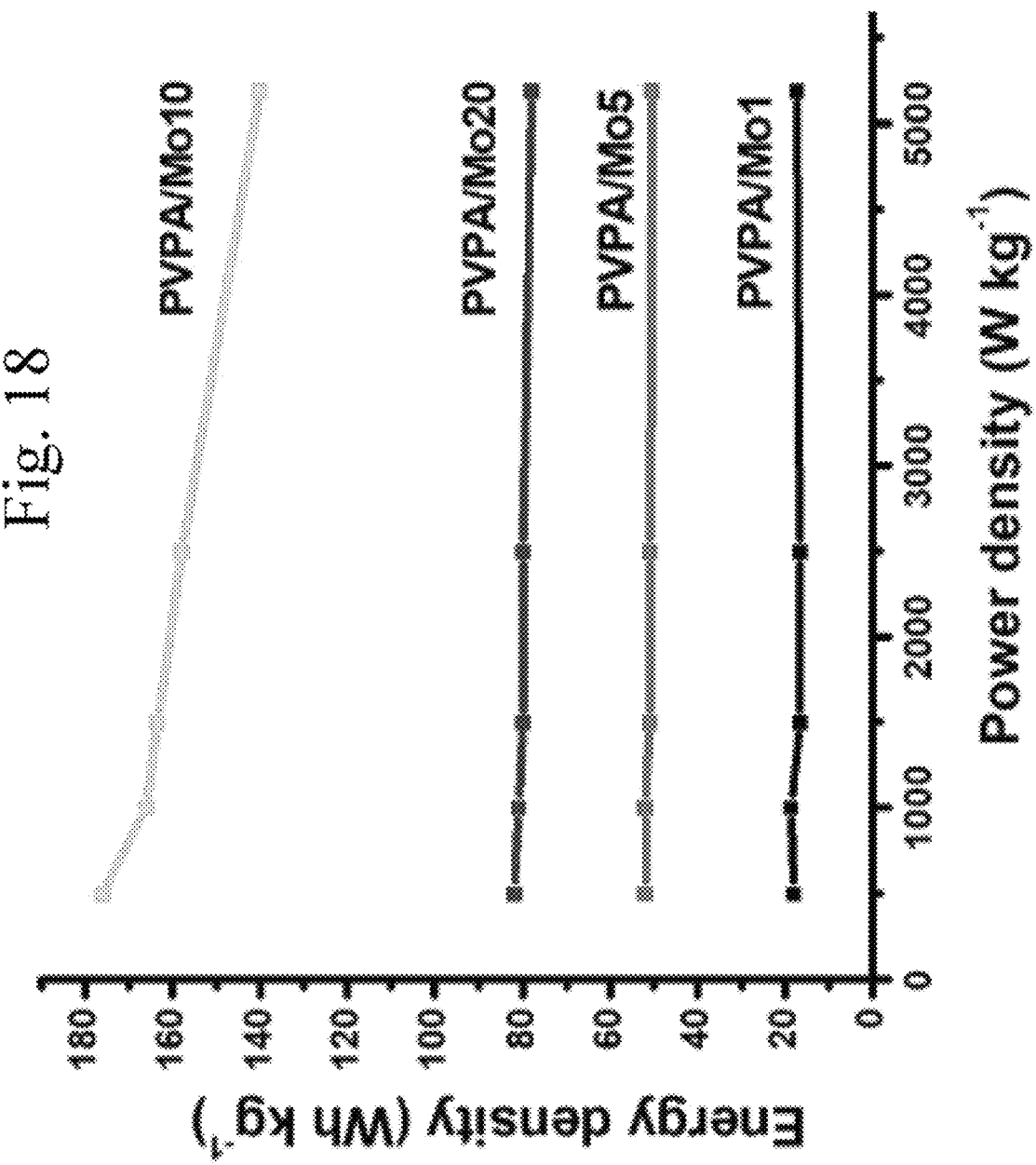
FIG. 18 shows Ragone plots of the exemplary inventive supercapacitors including PVPA/Mo1, PVPA/Mo5, PVPA/Mo10, and PVPA/Mo20 hydrogels.

FIG. 18 shows plots of the power density and energy density of PVPA and exemplary inventive PVPA/MoX hydrogel-based symmetric supercapacitors. The plots show that the supercapacitor comprising PVPA/Mo10 has the highest energy density tested, i.e., 180.2 Wh/kg at power density of 500 W/kg, and an energy density of 170.2 Wh/kg at a power density of 1.000 kW/kg. Still higher energy of 148.2 Wh/kg could be harvested at a power density of 5200 W/kg. This behavior may be explained by supercapacitors with PVPA/Mo hydrogel losing their capability faster at high rates, leading to more power loss.

Figure 19:
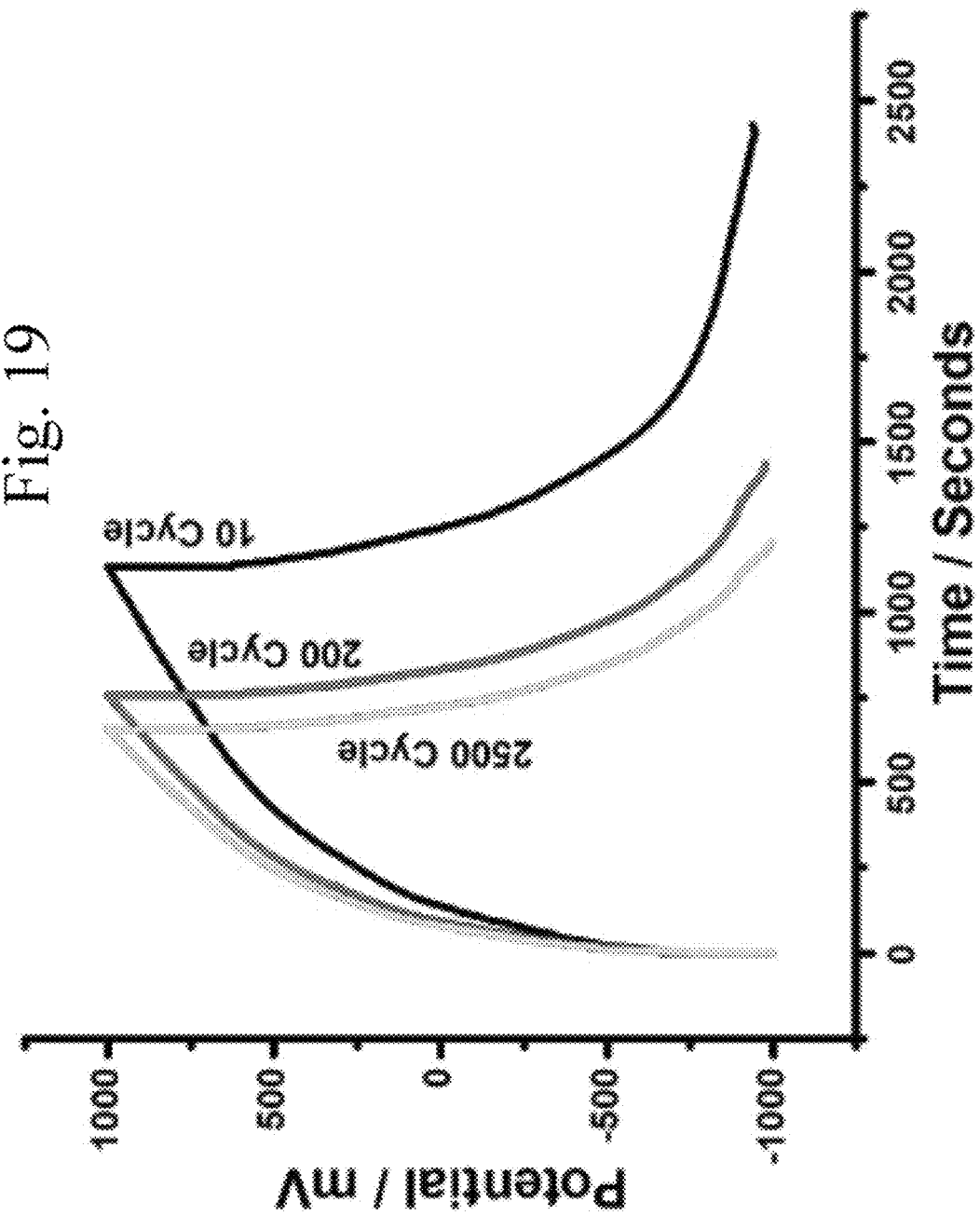
FIG. 19 shows galvanostatic charge-discharge (GCD) curves obtained after 10, 200, and 2500 cycles for an exemplary inventive PVPA/Mo10 supercapacitor.

FIG. 19 shows test results for the specific capacity of the exemplary supercapacitor comprising the PVPA/Mo10 hydrogel, comparing the galvanostatic charge-discharge (GCD) curves versus cycle count. An unexpectedly superior performance up to $100^{th}$ cycle (FIG. 19 shows comparative Cp at initial 10 cycle, 200 cycle and 2500 cycles) was observed for the device comprising the PVPA/Mo10 hydrogel, which has specific capacitance of 1250 F/g. After that, a capacitance loss was observed up to $200^{th}$ cycle (middle curve), indicating that the device reached stabilization. This can be attributed to the fast diffusion of Mo ions, yielding high rates in the first 200 cycles. After the $200^{th}$ cycle, the electrochemical redox reactions may be reduced by diminishing numbers of ions slightly decreasing the performance of the device. Comparing the GCD curves after the $200^{th}$ and 2500th cycles, the device comprising the PVPA/Mo$_{10}$ hydrogen lost ca. 15% of its initial performance after 2300 GCD cycles.

FIG. 20 shows experiments on the cyclability of the different PVPA/Mo-based supercapacitor devices performed by applying 2500 galvanostatic charge-discharge (GCD) cycles. Tests were performed using similar supercapacitor devices at an applied current density of 1 mA. The PVPA/Mo10-containing supercapacitor showed comparable performance after 2500 cycles. All devices tend to lose a performance in the first 200 cycles, which may be due to the electrode polyelectrolyte reaching the maximum ion transfer ability. The PVPA/Mo10 device retained the almost 85% of its performance between 200 and 2500 cycles.

Figure 21B:
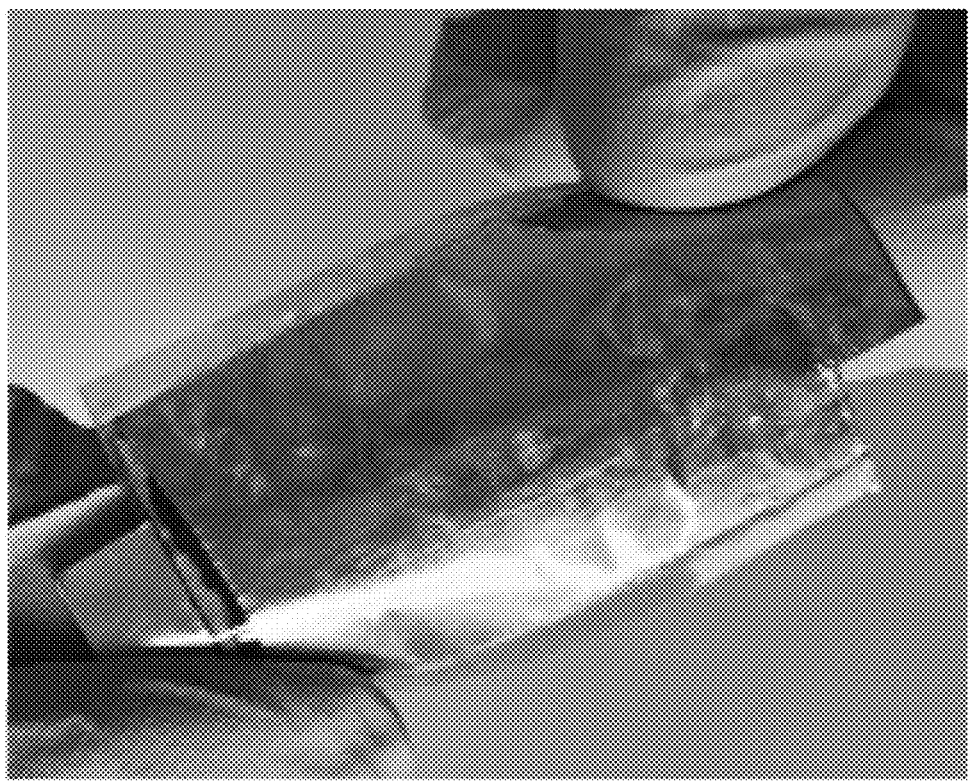
FIG. 21B shows a photographic image of an exemplary fabricated inventive supercapacitor.
Figure 21A:
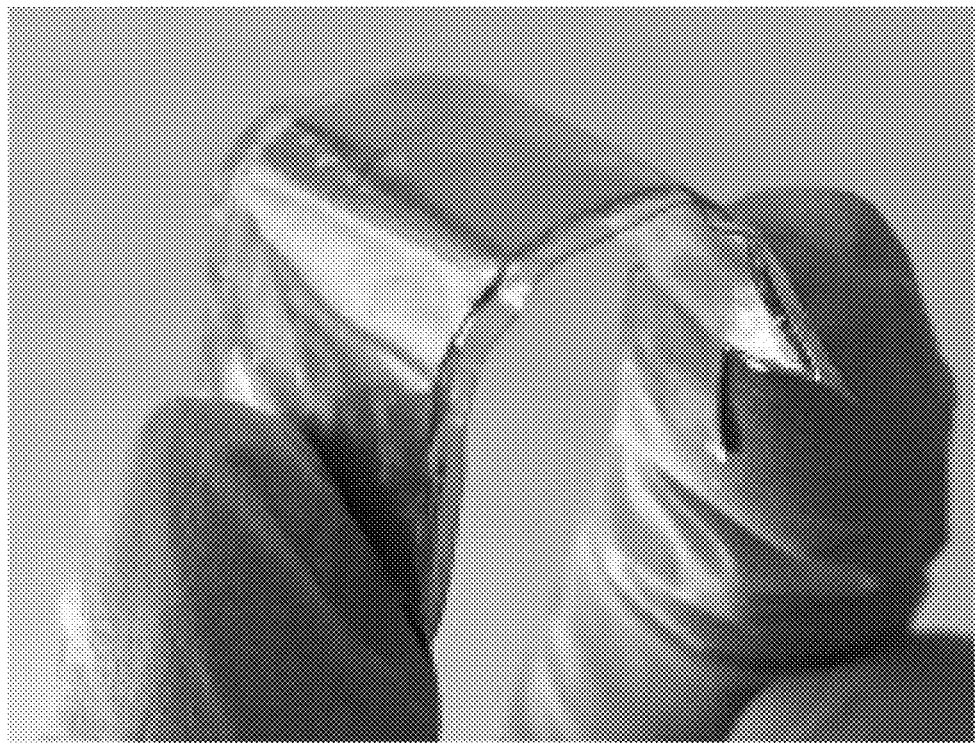
FIG. 21A shows a photographic image of an exemplary fabricated inventive supercapacitor.
Figure 22:
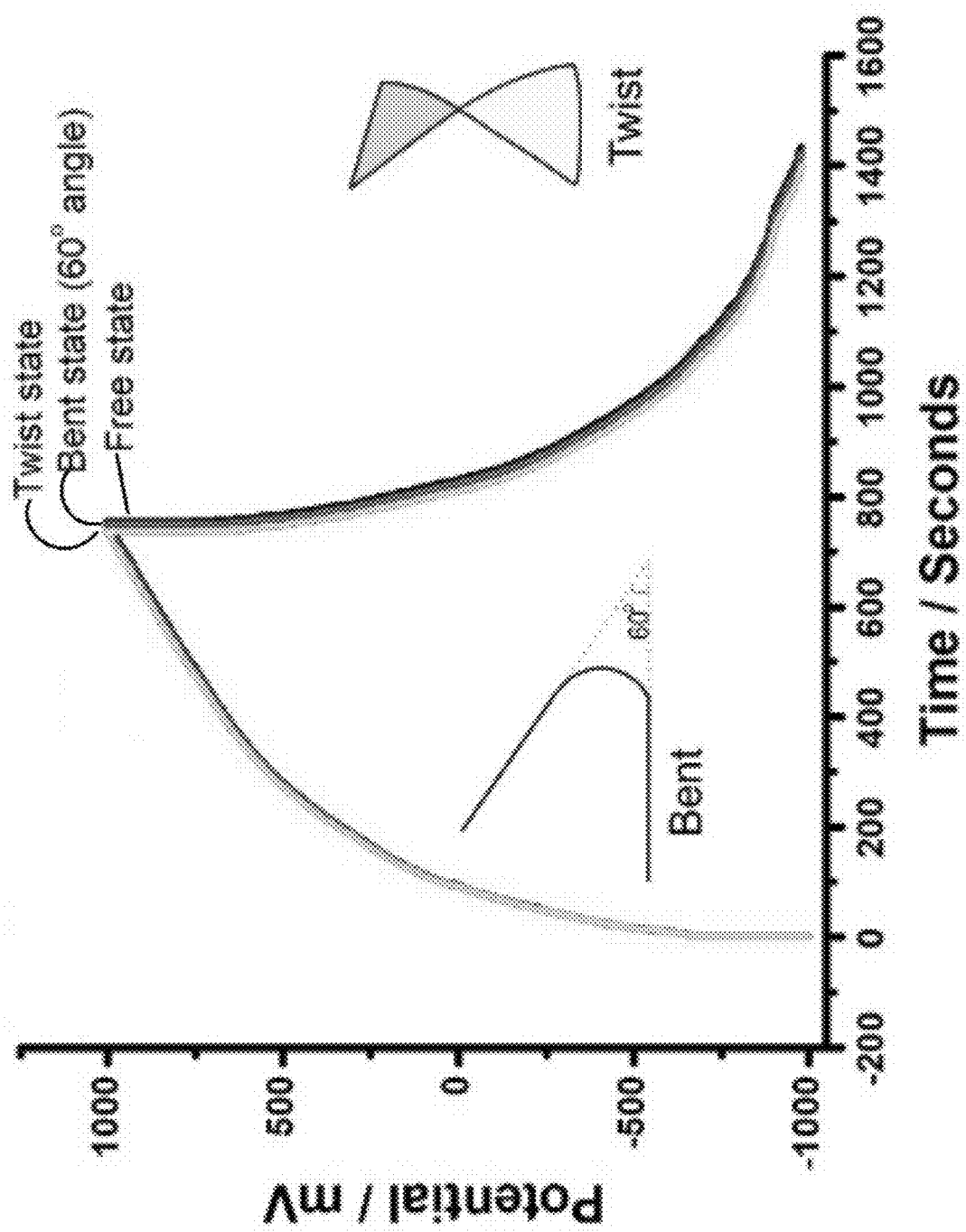
FIG. 22 shows galvanostatic charge-discharge (GCD) curves of inventive supercapacitors in free, bent, and twisted state.

FIGS. 21A and 21B show digital photographs of a device in twisted and bent state. The performance of the supercapacitor including PVPA/Mo$_{10}$ hydrogel under flexible conditions was also carried out as shown in FIG. 22. Galvanostatic charge-discharge (GCD) measurements were performed with a device in different states of contortion: free-standing, bent state at 60° angle; and twisted state. No significant change in specific capacitances for all different states, i.e., 987 F/g free standing, 980 F/g at 60° bent, and 978.5 F/g in twisted state, was observed at a current density of 1 mA. This result indicates that the device has excellent capacitance stabilization due to the flexibility, and that its capacitance is diminished no more than 2.5, 5, 7.5, 10, or 12.5% in various bent and/or twisted states, e.g., 30, 45, 60, 75, or 90°.

Numerous modifications and variations of the present invention are possible in light of the above teachings. It is therefore to be understood that within the scope of the appended claims, the invention may be practiced otherwise than as specifically described herein.

The invention claimed is:

1. A charge-discharge method for charge-discharge cycling a polymer-reinforced capacitor, comprising:
   subjecting the polymer-reinforced capacitor to charge-discharge cycle comprising:
      first, charging the polymer-reinforced capacitor,
      second, discharging the polymer-reinforced capacitor,
      repeating the charge-discharge cycle for at least 100 cycles;
   wherein charging the polymer-reinforced capacitor includes flowing an electrical current through a gel electrolyte layer of the polymer-reinforced capacitor, and developing a charge separation across the gel electrolyte layer of the polymer-reinforced capacitor,
   wherein the polymer-reinforced capacitor comprises:
      a first electrically conducting layer;
      an electrolyte layer comprising:
         poly(vinylphosphonic acid);
         a polymer mesh reinforcement, and
         a molybdate redox mediator in an amount in a range of from 1.0 to 20.0 wt. % of a total electrolyte weight,
      wherein the electrolyte is in gel form; and
      a second electrically conducting layer,
      wherein the electrolyte layer is sandwiched between the electrically conducting layers.

2. The charge-discharge method of claim 1, wherein the polymer-reinforced capacitor is a symmetric capacitor.

3. The charge-discharge method of claim 1, wherein the first and/or second electrically conductive layer of the polymer-reinforced capacitor comprises at least 50 wt. % activated carbon, relative to a total weight of the electrically conductive layer.

4. The charge-discharge method of claim 1, wherein the first and/or second electrically conductive layer of the polymer-reinforced capacitor comprises conductive carbon in an amount of from 5 to 25 wt. %, relative to a total weight of the electrically conductive layer.

5. The charge-discharge method of claim 1, wherein the first and/or second electrically conductive layer of the polymer-reinforced capacitor comprises no more than 33 wt. % of a binder, relative to a total weight of the electrically conductive layer.

6. The charge-discharge method of claim 1, wherein the first and/or second electrically conductive layer of the polymer-reinforced capacitor consist essentially of activated carbon, conductive carbon, and binder.

7. The charge-discharge method of claim 1, wherein the redox mediator of the polymer-reinforced capacitor comprises a metal.

8. The charge-discharge method of claim 1, wherein the redox mediator of the polymer-reinforced capacitor comprises at least 75 wt. % Mo, relative to a total elemental metal weight in the redox mediator.

9. The charge-discharge method of claim 1, wherein the redox mediator of the polymer-reinforced capacitor comprises a molybdate
   $(NH_4)_2MoO_4$ is in an amount of from 7.5 to 17.5 wt. % of the total electrolyte weight.

10. The charge-discharge method of claim 1, wherein the polymer-reinforced capacitor maintains at least 85% of its specific capacitance in a 60° bent and/or twisted state, relative to a flat state of an initial capacitance performance after 2300 of the charge-discharge cycles.

11. The charge-discharge method of claim 1, wherein the polymer-reinforced capacitor comprises outer layers of aluminum.

12. The charge-discharge method of claim 1, wherein the polymer-reinforced capacitor has a specific capacitance in a range of from 1000 to 1500 F/g, and/or
   an energy density in a range of from 150 to 210 Wh/kg at power density of 500 W/kg.

* * * * *